United States Patent
Nelson

(10) Patent No.: US 10,698,728 B1
(45) Date of Patent: Jun. 30, 2020

(54) SYSTEMS AND METHODS FOR FORMING APPLICATION-SPECIFIC BLOCKCHAINS

(71) Applicant: Blockstack PBC, New York, NY (US)

(72) Inventor: Jude Nelson, New Brunswick, NJ (US)

(73) Assignee: Blockstack PBC, New York, NY (US)

( * ) Notice: Subject to any disclaimer, the term of this patent is extended or adjusted under 35 U.S.C. 154(b) by 0 days.

(21) Appl. No.: 16/685,991

(22) Filed: Nov. 15, 2019

(51) Int. Cl.
*G06F 9/46* (2006.01)
*G06F 9/48* (2006.01)
*G06F 9/50* (2006.01)
*G06F 16/182* (2019.01)
*H04L 29/08* (2006.01)
*H04L 9/06* (2006.01)

(52) U.S. Cl.
CPC ............ *G06F 9/4875* (2013.01); *G06F 9/466* (2013.01); *G06F 9/5088* (2013.01); *G06F 16/1837* (2019.01); *H04L 9/0637* (2013.01); *H04L 67/1051* (2013.01)

(58) Field of Classification Search
None
See application file for complete search history.

(56) References Cited

U.S. PATENT DOCUMENTS

| | | | |
|---|---|---|---|
| 10,102,265 B1 * | 10/2018 | Madisetti | ........... G06Q 20/0658 |
| 2017/0236123 A1 | 8/2017 | Ali et al. | |
| 2019/0122186 A1 * | 4/2019 | Kano | ................... G06Q 20/065 |

OTHER PUBLICATIONS

Xu et al. "Become: Blockchain-enabled computation offloading for IoT in mobile edge computing", IEEE Transactions on Industrial Informatics, 2019 (Year: 2019).*
Ali, Muneeb, Dissertation, Trust-to-Trust Design of a New Internet, dated Jun. 2017.
Ali, Muneeb et al., Blockstack: A New Decentralized Internet, dated May 2017.
Ali, Muneeb et al., Blockstack: A New Internet for Decentralized Applications, dated Oct. 2017.
Ali, Muneeb et al., Blockstack: A Global Naming and Storage System Secured by Blockchains. In Proceedings of the 2016 USENIX Annual Technical Conference, Jun. 2016.
Ali, Muneeb et al., Bootstrapping Trust in Distributed Systems with Blockchains. In USENIX ;login 41(3):52-58, Fall 2016.
Ali, Muneeb et al., The Blockstack Decentralized Computing Network, dated May 30, 2019.
Nelson, Jude et al., Extending Existing Blockchains with Virtualchain. In Workshop on Distributed Cryptocurrencies and Consensus Ledgers, 2016.
Nelson, Jude, Dissertation: Wide-Area Software-Defined Storage, dated Jun. 2018.

* cited by examiner

*Primary Examiner* — Wissam Rashid
(74) *Attorney, Agent, or Firm* — Knobbe Martens Olson & Bear LLP

(57) ABSTRACT

An improved blockchain implementation that reduces application transaction processing bottlenecks for applications that operate on a decentralized network is described herein. For example, if an application operating on a decentralized network becomes sufficiently popular, an existing blockchain can be split into the original blockchain and an application-specific chain (or app chain) that includes blocks that only store transactions for the sufficiently popular application. Multiple application-specific chains can be formed as different applications become sufficiently popular. The original blockchain may be used to perform sortitions to select which miners should mine new blocks in the application-specific chain(s).

20 Claims, 13 Drawing Sheets

SYSTEMS AND METHODS FOR FORMING APPLICATION-SPECIFIC BLOCKCHAINS

BACKGROUND

A blockchain is a distributed ledger that can be used to record transactions and reduce the likelihood that recorded transactions are altered retroactively. Generally, a blockchain can be implemented within a peer-to-peer network. Computing devices participating in the peer-to-peer network can each include a copy of the blockchain and broadcast transactions to other computing devices participating in the peer-to-peer network.

The blockchain itself can include a chain of blocks that are linked together cryptographically, with each block in the chain storing one or more transactions and the number of blocks in the chain growing over time. For example, a transaction can include a cryptocurrency payment, execution of a smart contract, submission of an online vote, and/or any other type of exchange or event. The blocks can be linked together using a cryptographic hash. For example, each block can include a cryptographic hash of a previous block in the chain. Because each block includes a cryptographic hash of a previous block in the chain, a transaction stored in one block cannot be altered without all subsequent blocks being altered as well. The likelihood that all subsequent blocks being altered is low given that such an alteration would require approval from a majority of the computing devices or participants participating in the blockchain.

SUMMARY

The systems, methods, and devices described herein each have several aspects, no single one of which is solely responsible for its desirable attributes. Without limiting the scope of this disclosure, several non-limiting features will now be discussed briefly.

One aspect of the disclosure provides a computing device of a decentralized network comprising a network interface configured to couple the computing device to the decentralized network. The computing device further comprises a hardware processor. The computing device further comprises a non-transitory computer readable storage medium storing program instructions for execution by the hardware processor in order to cause the computing device to: process a plurality of transactions received from one or more application devices via the decentralized network, where the plurality of transaction are each associated with a first application and are received for storage in a block of a virtual chain; determine that the plurality of transactions associated with the first application have a load exceeding a threshold; in response to the determination that the load exceeds the threshold, solicit, via the decentralized network, a peer device to process a future plurality of transactions associated with the first application for storage in a first block of an app chain to be formed and that will be anchored to the virtual chain; and enable a proof of burn code corresponding to the first application to allow one or more miner devices to participate in a single-leader election for selecting a miner device in the one or more miner devices to mine the first block in the app chain.

The computing device of the preceding paragraph can include any sub-combination of the following features: where the program instructions, when executed, further cause the computing device to determine that a percentage of computing resources of the computing device allocated to processing the plurality of transactions exceeds the threshold; where the program instructions, when executed, further cause the computing device to determine that the percentage of computing resources of the computing device allocated to processing the plurality of transactions exceeds the threshold for a second threshold number of blocks in the virtual chain; where the percentage of computing resources of the computing device allocated to processing the plurality of transactions exceeds the threshold for the second threshold number of consecutive blocks in the virtual chain; where the program instructions, when executed, further cause the computing device to enable the proof of burn code at a block in the virtual chain at which the first block in the app chain is anchored; where the program instructions, when executed, further cause the computing device to process a block commit transaction received via the decentralized network from a second miner device in the one or more miner devices after the proof of burn code is enabled; where the program instructions, when executed, further cause the computing device to perform a sortition using the block commit transaction to select a leader of a second block in the app chain; where the program instructions, when executed, further cause the computing device to disable smart contract code corresponding to the first application at a block in the virtual chain at which the first block in the app chain is anchored; where the virtual chain logically resides above a burn chain that corresponds to a first cryptocurrency, and where a second miner device in the one or more miner devices is configured to submit a block commit transaction in the burn chain to burn a first amount of the first cryptocurrency to participate in a sortition to be selected to mine one or more blocks in the virtual chain; where blocks in the app chain store transactions corresponding to the first application only; where a block in the virtual chain that precedes a block in the virtual chain at which the first block in the app chain is anchored stores a first transaction corresponding to the first application, and where a block in the virtual chain that follows the block in the virtual chain at which the first block in the app chain is anchored does not store any transaction corresponding to the first application; where the program instructions, when executed, further cause the computing device to perform a chain mitosis in which the app chain is split into an app burn chain, a first split app chain, and a second split app chain in response to a determination that a number of transactions corresponding to the first application that are stored in the app chain exceed a threshold; where a block in the app burn chain stores at least one of one or more first block commit transactions used to select a second miner device in the one or more miner devices to mine a block in the first split app chain or one or more second block commit transactions used to select a third miner device in the one or more miner devices to mine a block in the second split app chain; where a block in the first split app chain stores one or more transactions of a first type only, and where a block in the second split app chain stores one or more transactions of a second type only; and where the one or more transactions of the first type correspond to one or more transactions of the first application that originate from a first geographic region, and where the one or more transactions of the second type correspond to one or more transactions of the first application that originate from a second geographic region that is different than the first geographic region.

Another aspect of the disclosure provides a computer-implemented method comprising: under control of a computing device in a decentralized network, receiving a plurality of transactions from one or more application devices via the decentralized network, where the plurality of transaction are each associated with a first application and are received for storage in a block of a virtual chain; determining that the plurality of transactions associated with the first application have a load exceeding a threshold; in response to the determination that the load exceeds the threshold, soliciting, via the decentralized network, a peer device to process a future plurality of transactions associated with the first application for storage in a first block of an app chain to be formed and that will be anchored to the virtual chain; and enabling a proof of burn code corresponding to the first application to allow one or more miner devices to participate in a single-leader election for selecting a miner device in the one or more miner devices to mine the first block in the app chain.

The computer-implemented method of the preceding paragraph can include any sub-combination of the following features: where determining that the plurality of transactions associated with the first application have a load exceeding a threshold further comprises determining that a percentage of computing resources of the computing device allocated to processing the plurality of transactions exceeds the threshold; and where determining that a percentage of computing resources of the computing device allocated to processing the plurality of transactions exceeds the threshold further comprises determining that the percentage of computing resources of the computing device allocated to processing the plurality of transactions exceeds the threshold for a second threshold number of blocks in the virtual chain.

Another aspect of the disclosure provides non-transitory, computer-readable storage media comprising computer-executable instructions for performing chain mitosis in a blockchain, where the computer-executable instructions, when executed by a computer system, cause the computer system to: process a plurality of transactions received from one or more application devices via a decentralized network to which the computer system communicates, where the plurality of transaction are each associated with a first application and are received for storage in a block of a virtual chain; determine that an app chain should fork off the virtual chain in response to processing the plurality of transactions associated with the first application; in response to the determination that the app chain should fork off the virtual chain, solicit, via the decentralized network, a peer device to process a future plurality of transactions associated with the first application for storage in a first block of an app chain to be formed and that will be anchored to the virtual chain; and enable a proof of burn code corresponding to the first application to allow one or more miner devices to participate in a single-leader election for selecting a miner device in the one or more miner devices to mine the first block in the app chain.

The non-transitory, computer-readable storage media of the preceding paragraph can include any sub-combination of the following features: where the computer-executable instructions further cause the computer system to: determine that a percentage of computing resources of the computing device allocated to processing the plurality of transactions exceeds a threshold; and determine that the app chain should fork off the virtual chain in response to the determination that the percentage exceeds the threshold.

Another aspect of the disclosure provides a computing device of a decentralized network comprising a network interface configured to couple the computing device to the decentralized network. The computing device further comprises a hardware processor. The computing device further comprises a non-transitory computer readable storage medium storing program instructions for execution by the hardware processor in order to cause the computing device to: process a plurality of transactions received from one or more application devices via the decentralized network, where the plurality of transaction are each associated with a first application and are received for storage in a block of a virtual chain; process a block commit transaction received from a miner device via the decentralized network, where the block commit transaction is transmitted by the miner device such that the miner device can participate in a sortition to select a leader of a new block in an app chain that is anchored to the virtual chain, where the app chain is associated with a second application such that transactions corresponding to the second application are only stored in blocks of the app chain; store block data for the block of the virtual chain that stores the plurality of transactions and the block commit transaction; perform a sortition for a first block in the app chain using the block commit transaction; process a message indicating receipt of a first transaction associated with the second application from the one or more application devices via the decentralized network; and ignore the first transaction associated with the second application.

The computing device of the preceding paragraph can include any sub-combination of the following features: where the program instructions, when executed, further cause the computing device to track the virtual chain and not track the app chain; where the program instructions, when executed, further cause the computing device to store block data for blocks in the virtual chain and not store block data for blocks in the app chain; where a second app chain is anchored to the virtual chain, and where the second app chain is associated with a third application; where the program instructions, when executed, further cause the computing device to: process a second message indicating receipt of a second transaction associated with the third application from the one or more application devices via the decentralized network, and store block data for a block in the second app chain that stores the second transaction; where the program instructions, when executed, further cause the computing device to track the virtual chain, track the second app chain, and not track the app chain; where an app burn chain formed from a second app chain is anchored to the virtual chain, where a first split app chain is anchored to the app burn chain and a second split app chain is anchored to the app burn chain, where the first split app chain is associated with a first type of transaction corresponding to a third application, and where the second split app chain is associated with a second type of transaction corresponding to the third application; where the program instructions, when executed, further cause the computing device to: store block data for blocks in the app burn chain, process a second message indicating receipt of a second transaction of the first type from the one or more application devices via the decentralized network, and ignore the second transaction of the first type; where the program instructions, when executed, further cause the computing device to: store block data for blocks in the app burn chain, process a second message indicating receipt of a second transaction of the second type from the one or more application devices via the decentralized network, and store block data for a block in the second split app chain that stores the second transaction; and where the first type of transaction corresponds to a transaction of the third application that originates from a first geographic region, and where the second type of transaction corresponds to a transaction of the third application that originates from a second geographic region that is different than the first geographic region.

Another aspect of the disclosure provides a computer-implemented method comprising: under control of a computing device in a decentralized network, receiving a plurality of transactions from one or more application devices via the decentralized network, where the plurality of transaction are each associated with a first application and are received for storage in a block of a virtual chain; receiving a block commit transaction received from a miner device via the decentralized network, where the block commit transaction is transmitted by the miner device such that the miner device can participate in a sortition to select a leader of a new block in an app chain that is anchored to the virtual chain, where the app chain is associated with a second application such that transactions corresponding to the second application are only stored in blocks of the app chain; storing block data for the block of the virtual chain that stores the plurality of transactions and the block commit transaction; performing a sortition for a first block in the app chain using the block commit transaction; receiving a first transaction associated with the second application from the one or more application devices via the decentralized network; and ignoring the first transaction associated with the second application.

The computer-implemented method of the preceding paragraph can include any sub-combination of the following features: where ignoring the first transaction associated with the second application further comprises tracking the virtual chain and not tracking the app chain; where ignoring the first transaction associated with the second application further comprises storing block data for blocks in the virtual chain and not storing block data for blocks in the app chain; where a second app chain is anchored to the virtual chain, and where the second app chain is associated with a third application; where the computer-implemented method further comprises: receiving a second transaction associated with the third application from the one or more application devices via the decentralized network, and storing block data for a block in the second app chain that stores the second transaction; and where storing block data for a block in the second app chain that stores the second transaction further comprises tracking the virtual chain, tracking the second app chain, and not tracking the app chain.

Another aspect of the disclosure provides non-transitory, computer-readable storage media comprising computer-executable instructions for selectively processing transactions in a blockchain, where the computer-executable instructions, when executed by a computer system, cause the computer system to: process a plurality of transactions received from one or more application devices via a decentralized network to which the computer system communicates, where the plurality of transaction are each associated with a first application and are received for storage in a block of a virtual chain; process a block commit transaction received from a miner device via the decentralized network, where the block commit transaction is transmitted by the miner device such that the miner device can participate in a sortition to select a leader of a new block in an app chain that is anchored to the virtual chain, where the app chain is associated with a second application such that transactions corresponding to the second application are only stored in blocks of the app chain; store block data for the block of the virtual chain that stores the plurality of transactions and the block commit transaction; perform a sortition for a first block in the app chain using the block commit transaction; process a message indicating receipt of a first transaction associated with the second application from the one or more application devices via the decentralized network; and ignore the first transaction associated with the second application.

The non-transitory, computer-readable storage media of the preceding paragraph can include any sub-combination of the following features: where the computer-executable instructions further cause the computer system to track the virtual chain and not track the app chain; where the computer-executable instructions further cause the computer system to store block data for blocks in the virtual chain and not store block data for blocks in the app chain; and where a second app chain is anchored to the virtual chain, where the second app chain is associated with a third application, and where the computer-executable instructions further cause the computer system to: process a second message indicating receipt of a second transaction associated with the third application from the one or more application devices via the decentralized network, and store block data for a block in the second app chain that stores the second transaction.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION OF SPECIFIC EMBODIMENTS

Figure 1:
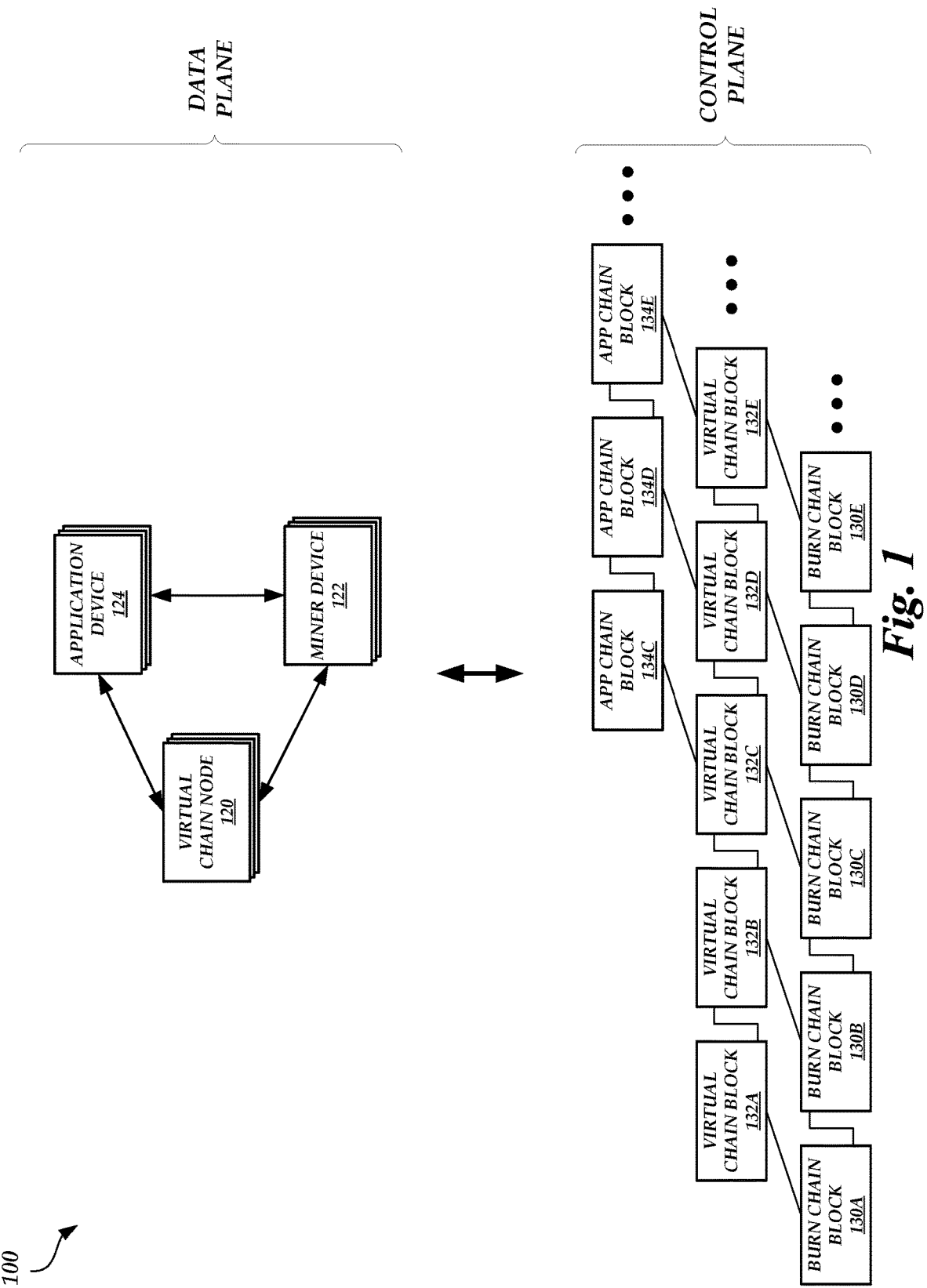
FIG. 1 is a block diagram of an illustrative operating environment in which an improved blockchain implements chain mitosis to reduce the likelihood that the blockchain strangles transactions associated with applications.

As described above, a blockchain is a distributed ledger that can be used to record transactions. The blockchain includes a set of blocks, the number of which grows over time. To allow the blockchain to grow, some computing devices may function as "miners," with at least one of the miners (e.g., computing devices) being selected to form a new block in the blockchain. The selected computing device may be referred to as a leader. To be considered for selection as a leader, a computing device may be required to expend resources. For example, in some conventional blockchain implementations, a computing device may be required to generate a proof of work in which the computing device is attempting to generate a hash value that is less than a target value. A computing device may have to generate multiple hash values before finding one that is less than the target value. The computing device is therefore consuming computing resources (e.g., processing resources), and ultimately energy (e.g., electricity), to find a hash value that is less than the target value.

Generally, the computing device that is first to find a hash value that is less than the target value is selected as the leader. While there is a cost associated with becoming the leader (e.g., the cost of the electricity consumed to find the hash value that is less than the target value), the computing device selected as a leader is rewarded with a block reward (e.g., cryptocurrency) and/or transaction fees. For example, as described herein, transactions are stored or encoded in blocks. To submit a transaction, a computing device (e.g., a user's wallet, an application device, etc.) may have to pay a transaction fee to the leader (e.g., computing device acting as the miner) forming the block within which the transaction is to be stored.

Relying on the proof of work to select the leader can prevent one computing device from simulating multiple computing devices in an attempt to "stuff the ballot" and become the leader of the next block in the blockchain. However, this approach can be wasteful as a high amount of energy may be consumed each time a new block is formed in the blockchain. In addition, this approach can favor computing devices that have access to a cheaper source of energy. For example, a computing device with access to a cheap source of energy may be able to generate more hashes than another computing device in an attempt to find a hash value that is less than the target value before the energy cost outweighs any transaction fees that may be garnered by being selected as the leader. Moreover, this approach can favor computing devices that have computing power (e.g., processing power) that far exceeds the computing power of other computing devices. Such computing devices may be able to generate hashes faster than other computing devices, and therefore be selected as leader more often than other computing devices.

Accordingly, the present disclosure is directed to a blockchain implementation in which a single-leader election algorithm is executed to overcome the deficiencies of existing blockchain implementations, such as implementations that rely on the proof of work discussed above. For example, the single-leader election algorithm may include a series of rounds, where at most one miner (e.g., a computing device participating in the peer-to-peer network that is acting as a miner) is selected as a leader in each round and the selected leader is able to form a new block in the blockchain (also referred to herein as the "stack chain" or the "virtual chain"). The single-leader election is not an election in which there are votes, but an election in which a miner is selected as a leader at random to avoid bias, such as the bias discussed above that is present in existing blockchain implementations. Any miner can become a leader, and the elections are driven by burning or destroying a cryptocurrency that is different than the cryptocurrency provided to a miner as a block reward and transaction fees when the miner is selected as a leader. The burned or destroyed cryptocurrency can be any cryptocurrency in which all miners and/or all nodes (e.g., peers that store an incomplete or complete copy of the blockchain, such as information for each of the current blocks in the blockchain) in the peer-to-peer network have access to the same information about the cryptocurrency. For example, such cryptocurrencies can include BITCOIN, ETHEREUM, LITECOIN, ZCASH, MONERO, NAMECOIN, PEERCOIN, etc.

As described in greater detail below, the single-leader election algorithm involves a cryptographic sortition that uses a burn chain (e.g., a blockchain corresponding to the cryptocurrency to be burned or destroyed) and a stack chain or virtual chain that logically resides above the burn chain. Each block in the stack chain is anchored to a block in the burn chain, and the miner that wins an election is allowed to form a new block in the stack chain. The burn chain encodes the election history, which occurs in two phases.

In the first phase, miners that wish to participate in a future election register a public key in a block in the burn chain. A miner may register a public key by submitting a public key registration transaction. Once a miner registers a public key in one block in the burn chain, the miner may start participating in an election associated with a child block in the burn chain (e.g., the next block in the burn chain, the block after next in the burn chain, etc.).

The first phase functions to reduce bias in the election process. As described below, the verifiable random function (VRF) proof of a miner is a factor in selecting a leader of a new block being formed in the stack chain. The public key of the miner can be used to verify that the VRF proof originated from the miner and has not been altered after being submitted in a block commit. Once a miner registers a public key in the burn chain, the public key cannot be altered. Thus, even if a miner is aware at a later time of a VRF proof that could improve the miner's chances of being selected as the leader, the miner cannot alter the node's VRF proof to improve unfairly these chances.

In the second phase, a miner that wishes to participate in an election in association with a current block in the burn chain submits a block commit transaction. The block commit transaction includes a VRF proof (or a hash of the VRF proof) and an indication that a certain amount of the cryptocurrency associated with the burn chain has been burned or destroyed. For example, the miner may generate a message that is a hash of a VRF proof present in a previous block in the stack chain or may obtain the hash of the VRF proof if this hash (rather than the VRF proof itself) is already present in a header of the previous block in the stack chain. The miner may then generate the VRF proof included in the block commit using the message and the node's private key (e.g., by hashing the message and the node's private key, by a combination of hashing the message and the node's private key and performing algebraic operations on elliptic curve points, etc.).

Any number of miners can submit block commit transactions in association with a current block in the burn chain. The probability that any one miner is selected as the leader to form the next block in the stack chain may be based on how much cryptocurrency is burned or destroyed by the respective miner. For example, if one miner destroyed 20% of all the cryptocurrency destroyed by all miners in the aggregate in association with a particular block in the burn chain, then this miner may have a 20% chance of being selected as the leader.

Some or all of the peers and/or miners participating in the peer-to-peer network can each process a set of operations to perform the election or sortition for selecting the leader of a new block in the stack chain. For example, once all block commits have been received for a particular block in the burn chain, a peer and/or miner can assign a range of values between 0 and $2^{256}-1$ to each miner that submitted a block commit. The length of an assigned range may correspond to the amount of cryptocurrency destroyed by the respective miner. For example, a miner that destroyed 20% of all the cryptocurrency destroyed in association with the block commits may be assigned 20% of the range of values between 0 and $2^{256}-1$. The peer and/or miner can then obtain a proof of work nonce from the header of the particular block in the burn chain, and identify a value between 0 and $2^{256}-1$ using the message and the proof of work nonce. As an illustrative example, the peer and/or miner can sum, hash, or otherwise combine the message and the proof of work nonce (which may be optionally scaled up from a value between 0 and $2^{32}-1$ to a value between 0 and $2^{256}-1$), and calculate the combination modulo $2^{256}-1$ to identify the value in the range. The miner assigned a range of values within which the identified value falls is then selected by the peer(s) and/or miner(s) as the leader of the next block in the stack chain.

The operations described above for selecting the leader of the next block in the stack chain can prevent or reduce the likelihood of "ballot stuffing" because the chances for being selected as the leader can only be improved by destroying a resource (e.g., burning cryptocurrency)—simulating multiple miners in attempt to become the leader is therefore ineffective. Unlike existing blockchain implementations, however, the improved blockchain implementation disclosed herein that uses the disclosed single-leader election algorithm can reduce the likelihood of "ballot stuffing" without wasting excessive amounts of energy, without favoring miners that have cheap access to a source of energy, and without favoring miners that have computing power that far exceeds the computing power of other miners in the peer-to-peer network. Rather, miners in the improved blockchain implementation disclosed herein can conduct a single-leader election that is fair and unbiased, with the chances of being selected as a leader subject to a miner's willingness to part with a cryptocurrency associated with a burn chain.

In some cases, the transactions recorded by a miner to a block in the stack chain correspond to various applications. For example, traditional network-based applications store application data (e.g., user profile data, user progress data (e.g., number of levels completed by a user, gaming items obtained by a user, achievements or goals reached by a user, scores achieved by a user, areas unlocked by a user, and/or any other data describing the progression of a user in a gaming application), leaderboard data (e.g., a user ranking, a user score, etc.), data entered or posted by a user (e.g., text, images, videos, etc.), and/or any other data related to a gaming application, a word processing application, an image processing application, a social media application, an audio-visual application, etc.) in one or more central servers. Storing application data in central server(s), however, can be problematic. If the central server(s) fail, the application data can be lost. The application data can be compromised (e.g., modified without authorization, deleted, etc.) if a malicious actor gains access to the central server(s). Storing application data in a decentralized network, such as in blocks of the stack chain, can increase reliability and decrease the chances that the application data becomes compromised.

Traditional blockchain implementations do have some drawbacks, however, that can limit the benefits of storing application data as transactions in blocks. For example, there is generally a finite number of transactions that can be stored in a block and blocks are produced at a fixed rate. Thus, if a particular application becomes popular-causing a high volume of transactions to be generated as users interact with the application and produce updated application data—the time it takes to validate and store the application data transactions may increase over time. In fact, the more transactions that are being generated for a particular application and stored in a stack chain block, the fewer transactions corresponding to other applications that can be stored in the stack chain block. Thus, as one application becomes popular, the time it takes to validate and store application data transactions for other applications can increase over time as well, creating an undesirable processing bottleneck. The blockchain can essentially strangle application data transactions, resulting in network-based applications that are less responsive to user interactions (e.g., less responsive to users saving data, less responsive to users attempting to open saved data, etc.) and/or that otherwise run more slowly (e.g., take longer to process and display information, take longer to load updated application data, etc.).

Accordingly, the present disclosure is directed to an improved blockchain implementation in which a chain mitosis occurs with respect to the stack or virtual chain when the percentage of computing resources allocated by a peer and/or miner to processing transactions corresponding to a particular application exceeds a threshold for a certain number of consecutive blocks in the stack chain. Specifically, when the percentage of computing resources allocated by a peer and/or miner to processing transactions corresponding to a particular application exceeds a threshold for a certain number of consecutive blocks in the stack chain, the peer and/or miner can split the stack chain into the stack chain and an app chain, where the app chain will include blocks that only store transactions corresponding to the application that resulted in the chain mitosis. Once the split occurs, blocks in the stack chain will continue to store transactions corresponding to applications other than the application that resulted in the chain mitosis. Blocks in the stack chain, however, will no longer store transactions corresponding to the application that resulted in the chain mitosis (as such transactions will be stored in blocks of the newly formed app chain). Thus, when a peer and/or miner determines that an application has become sufficiently popular (e.g., the percentage of computing resources allocated by a peer and/or miner to processing transactions corresponding to the application exceeds a threshold for a certain number of consecutive blocks in the stack chain), the peer and/or miner can perform a load shedding activity in which transactions corresponding to the application that has become sufficiently popular are bundled up for processing by a chain separate from the stack chain. Performing the chain mitosis reduces the number of transactions to be stored in the stack chain, thereby reducing the likelihood that the blockchain will strangle application data transactions corresponding to the application that has become sufficiently popular and/or corresponding to other applications that are also storing transactions in the blockchain.

To implement the chain mitosis, a peer and/or miner can monitor the percentage of computing resources that are being dedicated to processing transactions corresponding to various applications. If the percentage corresponding to a first application exceeds a threshold for one or more consecutive blocks in the stack chain, the peer and/or miner can enter a pre-fork stage in which the peer and/or miner solicits initial peer(s) who will store a copy of the future app chain and/or solicits miner(s) who will mine blocks in the future app chain. An initial peer and/or miner can answer the solicitation by transmitting an address transaction that includes the Internet protocol (IP) address of the initial peer and/or miner. A peer and/or miner can store the address transaction in a block in the stack chain corresponding to the pre-fork stage. The pre-fork stage can include one or more blocks in the stack chain, at which point the split or fork can occur.

At the split or fork, the peer and/or miner prevents transactions corresponding to the first application from being stored in blocks in the stack chain. However, the peer and/or miner allows any of the initial miner(s) to submit proof of burn transactions (e.g., public key registration transactions and/or block commit transactions) in blocks in the stack chain after the split or fork occurs. A peer and/or miner can use the proof of burn transactions to perform a sortition—such as the single-leader sortition or election described herein—to elect a leader to process the next block in the newly formed app chain. The selected leader (which will be one of the initial miner(s)) can then form a new block in the app chain that includes only transactions corresponding to the first application. Thus, the stack chain can act as a burn chain with respect to the first application, but can act as a normal stack chain with respect to other applications. To prevent transactions corresponding to the first application from being stored in blocks in the stack chain, the peer and/or miner can disable smart contract code of the stack chain corresponding to the first application and enable a proof of burn code of the stack chain corresponding to the first application. In other words, the peer and/or miner switches from a smart contract code for the first application to a proof of burn code for the first application in association with the stack chain. Switching from the smart contract code to the proof of burn code prevents the smart contract code from being invokable by an application device (e.g., an application server or other computing system operated by an entity that created and/or provides an application, a device operated by a user running an application, etc.) or a user's wallet in association with the stack chain.

Once the app chain is formed, miners other than the initial miners can be elected the leader of a block in the app chain. For example, once the app chain is formed, any miner can submit a public key registration transaction and/or a block commit transaction in association with a stack chain block. A peer and/or miner can then perform a sortition in a manner as described herein to select a leader.

Not only does the chain mitosis shed load from the stack chain, but the chain mitosis also allows certain peers and/or miners to perform fewer operations. For example, a peer and/or miner may be interested in processing transactions corresponding to a first application, but not a second application. Prior to the chain mitosis, the peer and/or miner may process and track the entire stack chain even though some blocks in the stack chain may include transactions corresponding to the second application. If the second application becomes sufficiently popular, however, then the transactions corresponding to the second application may be bundled for processing by the app chain only. The peer and/or miner can then ignore transactions corresponding to the second application given that such transactions are now being stored in blocks in the app chain rather than in blocks in the stack chain. Rather, the peer and/or miner can simply track and process transactions being stored in the blocks of the stack chain. Blocks in the stack chain may include proof of burn transactions submitted by miners wishing to be selected as a leader of the next block in the app chain, so these are extra transactions that the peer and/or miner may process. However, the number of proof of burn transactions stored in the stack chain blocks may be dwarfed by the number of transactions corresponding to the second application that are being stored in the app chain blocks, especially given the fact that the chain mitosis occurs after the second application becomes sufficiently popular (e.g., the number of transactions corresponding to the second application increase substantially). Thus, on the whole, the peer and/or miner may be able to reduce the amount of network, storage, and/or computing resources dedicated to tracking transactions given that the peer and/or miner may not have to track two chains (e.g., the stack chain and the app chain) and/or to process transactions corresponding to the second application. In particular, the peer and/or miner can reduce a number of computational operations that are performed by simply storing block data for blocks in the stack chain and not storing block data for blocks in the app chain.

As described in greater detail below, additional chain mitoses can occur. For example, multiple applications can become sufficiently popular at the same or different times. Thus, a peer and/or miner can perform multiple chain mitoses, one for each of the sufficiently popular applications. Thus, multiple, different app chains can branch off the stack chain. Blocks in the stack chain can then store proof of burn transactions for different app chains.

As another example, if an app chain has already been formed and an application corresponding to the app chain continues to grow in popularity, a peer and/or miner can further split the app chain into an app burn chain, a first split app chain, and a second split app chain. The two split app chains may each be associated with the same application (e.g., the application associated with the original app chain), but may each store transactions corresponding to a specific type or portion of the application's data. For example, one split app chain may be associated with and store transactions corresponding to application data that originates in one geographic region and the other split app chain may be associated with application data that originates in another geographic region. Blocks in the app burn chain may only store proof of burn transactions corresponding to the first split app chain and the second split app chain. Thus, a peer and/or miner can use transactions in the app burn chain to perform a sortition (e.g., a single-leader election described herein) to determine the leader of the next block in the first split app chain and/or to determine the leader of the next block in the second split app chain.

The foregoing aspects and many of the attendant advantages of this disclosure will become more readily appreciated as the same become better understood by reference to the following detailed description, when taken in conjunction with the accompanying drawings.

Example Improved Blockchain Environment

FIG. 1 is a block diagram of an illustrative operating environment 100 in which an improved blockchain implements chain mitosis to reduce the likelihood that the blockchain strangles transactions associated with applications. The operating environment 100 includes a data plane and a control plane.

One or more virtual chain nodes 120, one or more miner devices 122, and/or one or more application devices 124 are present in the data plane. The virtual chain node(s) 120 may represent physical or virtual computing devices acting as peers or nodes (e.g., devices that store an incomplete or complete copy of the blockchain and that can verify some or all transactions that have occurred since the genesis of the blockchain) in a decentralized network, the miner device(s) 122 may represent physical or virtual computing devices acting as miners (e.g., devices that form new blocks in a blockchain, where some of the devices may also store an incomplete or complete copy of the blockchain and/or obtain information about the blockchain from other virtual chain nodes 120 and/or miner devices 122) in a decentralized network, and the application device(s) 124 may represent physical or virtual computing devices (e.g., devices operated by users of an application, devices or servers operated by an entity that provides or operates an application, etc.) with access to the decentralized network that provides application-related transactions (e.g., updates to application data, new application data, etc.) for storage in the blockchain. Each of the virtual chain node(s) 120, the miner device(s) 122, and the application device(s) 124 may communicate with each other in a decentralized network (e.g., a peer-to-peer network). In addition, user's wallets, not shown, may be present in the decentralized network and communicate with the virtual chain node(s) 120, the miner device(s) 122, and/or the application device(s) 124. The user's wallets may be virtual or physical computing devices that allow users to submit transactions for processing and storage in the blockchain.

In general, the virtual chain node(s) 120, the miner device(s) 122, and/or the application device(s) 124 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. As described in greater detail below, a virtual chain node 120 and/or a miner device 122 can launch and execute one or more virtual machine (VM) instances, where each VM instance acts as a node in a decentralized network that implements the virtual chain and/or app chain(s) described herein and can be associated with a user or participant. Thus, the terms "node" and "VM instance" can be used interchangeably.

In particular, each VM instance running on each virtual chain node 120 and/or miner device 122 may store the same information, such as burn chain block information (e.g., data identifying committed transactions, burn chain block header data, etc.), virtual chain block information (e.g., data identifying committed transactions, virtual chain block header data, etc.), app chain block information for one or more app chains (e.g., data identifying committed transactions, app chain block header data, etc.), etc. Generally, a VM instance tracks a single chain (e.g., the burn chain, the virtual chain, an app chain, etc.). Thus, a single computing device (e.g., a virtual chain node 120 or a miner device 122) can run multiple VM instances, one for each chain in the control plane. As an illustrative example, a single computing device can run one VM instance to track the burn chain (e.g., store burn chain block information), another VM instance to track the virtual chain (e.g., store virtual chain block information), another VM instance to track a first app chain (e.g., store app chain block information for the first app chain), another VM instance to track a second app chain (e.g., store app chain block information for the second app chain), and so on. The VM instances can communicate with each other to, for example, exchange information about the chain tracked by the respective VM instance (e.g., a VM instance tracking the virtual chain can share block header information with a VM instance tracking an app chain upon request by the VM instance tracking the app chain). A single computing device does not necessarily need to launch a different VM instance for each chain in the control plane, however. For example, a single computing device can launch VM instances to track some, but not all, of the chains in the control plane. In other embodiments, separate computing devices (e.g., different virtual chain nodes 120 or miner devices 122) can run separate VM instances, where each computing device runs a VM instance to track a different chain in the control plane. As an illustrative example, a first computing device can run a VM instance to track the burn chain, a second computing device can run a VM instance to track the virtual chain, a third computing device can run a VM instance to track an app chain, and so on. The computing devices can communicate with each other to, for example, exchange information about the chain tracked by the respective computing device (e.g., a computing device tracking the virtual chain can share block header information with a computing device tracking an app chain upon request by the computing device tracking the app chain).

The VM instances (or computing devices) corresponding to the same chain may store the same information because each VM instance (or computing device) may broadcast a message to one or more other VM instances (or one or more other computing devices) when the respective VM instance (or computing device) submits a transaction or receives a message indicating that a transaction has been submitted. For example, the VM instances (or computing devices) can communicate using a gossip protocol in which a VM instance (or computing device) forwards messages indicating that a transaction is submitted to its neighbor VM instances (or neighbor computing devices). Because each VM instance (or computing device) receives and stores the same transaction data, each VM instance (or computing device) has a copy of the same chain. The VM instances (or computing devices) can then independently perform the same operations to determine the leader of the next block in the virtual chain; when chain mitosis should occur to split the virtual chain into the virtual chain and an app chain; the leader of the next block in the app chain; when chain mitosis should occur to split an app chain into an app burn chain, a first split app chain, and a second split app chain; the leader of the next block in the first split app chain; the leader of the next block in the second split app chain; and/or the like, as described in greater detail below.

As an illustrative example, a first VM instance running on a first virtual chain node 120 may execute a series of operations to determine that chain mitosis should occur to split the virtual chain into the virtual chain and an app chain that corresponds to a first application. Similarly, a second VM instance running on a second virtual chain node 120 may execute the same operations to determine that chain mitosis should occur to split the virtual chain into the virtual chain and an app chain that corresponds to a first application, a third VM instance running on a third virtual chain node 120 may execute the same operations to determine that chain mitosis should occur to split the virtual chain into the virtual chain and an app chain that corresponds to a first application, and so on.

A virtual chain node 120 or miner device 122 can launch and execute a VM instance as a standalone application. Alternatively, a virtual chain node 120 or miner device 122 can run an application within which the VM instance is launched and executed. For example, the application can be a mobile application.

As described herein, VM instances or computing devices that track the virtual chain may store various data of the virtual chain. For example, the virtual chain node 120 or miner device 122 can launch a VM instance that tracks the virtual chain and that stores smart contract code (e.g., business logic) for one or more applications and proof of burn code for one or more applications. The smart contract code for an application may define functions that can be called by miner device(s) 122, application device(s) 124, and/or user's wallets (e.g., the smart contract code may define transactions that can be submitted by any of the devices and/or user's wallets, including the information to include in a transaction (e.g., information to include in a public key registration transaction, a block commit transaction, an IP address registration transaction, etc.)), rules or instructions that define under what conditions a chain mitosis should occur (e.g., what percentage of computing resources should be dedicated to processing transactions of the application and/or over how many blocks the percentage should be met before a pre-fork stage is initiated in which the virtual chain node 120 or miner device 122 solicits initial miners for a new app chain to be formed), rules or instructions that define the process by which the virtual chain node 120 or miner device 122 solicits initial miners for an app chain corresponding to the application when chain mitosis is to occur, and/or rules or instructions that define at which point (e.g., at which block in the virtual chain) a fork occurs to form the app chain once a determination is made that chain mitosis is to occur. The proof of burn code for an application may include rules or instructions that define how a sortition is to occur once the virtual chain is split into the virtual chain and an app chain corresponding to the application. The virtual chain node 120 or miner device 122 may initially enable the smart contract code for all applications (e.g., before any chain mitosis occurs with respect to the virtual chain) and disable the proof of burn code for all applications. Thus, the VM instance may initially allow any application transaction to be submitted by a miner device 122, an application device 124, and/or a user's wallet. However, the VM instance may not initially perform any sortitions. As described in greater detail below, the virtual chain node 120 or miner device 122 can disable the smart contract code and enable the proof of burn code for an application after the block in the virtual chain at which the fork is to occur in association with the application is formed. The VM instance can further store additional information, such as transactions that may be stored in a block in the virtual chain, the underlying blockchain to use as the burn chain, the type of cryptocurrency that is burned or destroyed during an election or sortition, and/or the like.

Similarly, VM instances or computing devices that track an app chain may store various data of the app chain. For example, the virtual chain node 120 or miner device 122 can launch a VM instance that tracks the app chain and that stores smart contract code (e.g., business logic) for the application corresponding to the app chain and proof of burn code for the application. The smart contract code may define functions that can be called by miner device(s) 122, application device(s) 124, and/or user's wallets (e.g., the smart contract code may define transactions that can be submitted by any of the devices and/or user's wallets, including the information to include in a transaction (e.g., information to include in a public key registration transaction, a block commit transaction, etc.)), rules or instructions that define under what conditions an app chain mitosis should occur (e.g., what number of blocks in the app chain should be formed that each have at least a threshold number of transactions before a pre-fork stage is initiated in which the virtual chain node 120 or miner device 122 optionally solicits initial miners for one or more new split app chains to be formed), rules or instructions that define the process by which the virtual chain node 120 or miner device 122 solicits initial miners for a new split app chain when the app chain mitosis is to occur, and/or rules or instructions that define at which point (e.g., at which block in the app chain) a fork occurs to form the app burn chain and one or more split app chains once a determination is made that app chain mitosis is to occur. The proof of burn code may include rules or instructions that define how a sortition is to occur once the app chain is split into the app burn chain and one or more split app chains, rules or instructions that define into how many split app chains are to be formed after the fork, rules or instructions that define what kind of transactions can be stored on each newly formed split app chain, and/or the like. The virtual chain node 120 or miner device 122 may initially enable the smart contract code (e.g., before any app chain mitosis occurs with respect to the app chain) and disable the proof of burn code. Thus, the VM instance may initially allow all transactions of the application to be submitted by a miner device 122, an application device 124, and/or a user's wallet. However, the VM instance may not initially perform any sortitions. As described in greater detail below, the virtual chain node 120 or miner device 122 can disable the smart contract code and enable the proof of burn code after the block in the app chain at which the fork is to occur is formed. The VM instance can further store additional information, such as transactions that may be stored in a block in the app chain (e.g., transactions corresponding to the application associated with the app chain), the underlying blockchain to use as the burn chain (e.g., the virtual chain), the type of cryptocurrency that is burned or destroyed during an election or sortition, and/or the like.

As described herein, each newly formed chain can be further split into a proof of burn chain and one or more split app chains. For example, a split app chain can be further split into a split app burn chain and one or more additional split app chains if the conditions that indicate a chain mitosis should occur (e.g., any of the conditions described herein) actually do occur. A virtual chain node 120 or miner device 122 can initialize a new VM instance to track a newly formed chain, with each new VM instance including smart contract code and proof of burn code (e.g., with the smart contract code initially being enabled and the proof of burn code initially being disabled until a chain mitosis occurs) similar to the code described herein to enable the transaction processing and chain mitosis to occur. Each new VM instance may further include some or all of the components described herein as being included in a VM instance (e.g., a transaction processor, an app chain solicitor, an app chain splitter, a sortition executor, a block data store, etc.).

In further embodiments, chain mitosis can occur with respect to a proof of burn chain as well. For example, if any of the chain mitosis conditions described herein occurs with respect to a proof of burn chain (e.g., a virtual chain after a chain mitosis occurs, an app burn chain, a split app burn chain, etc.), a virtual chain node 120 or miner device 122 can split the proof of burn chain into two (or more) separate proof of burn chains, where each proof of burn chain may handle sortitions for a specific application, specific applications, a specific type of application transaction for a particular application, specific types of application transactions for a particular application, and/or any combination thereof. A virtual chain node 120 or miner device 122 can initialize a new VM instance to track a newly formed proof of burn chain, with each new VM instance including proof of burn code (and/or smart contract code) similar to the code described herein to enable sortitions and possible future chain mitoses to occur. Each new VM instance may further include some or all of the components described herein as being included in a VM instance (e.g., a transaction processor, an app chain solicitor, an app chain splitter, a sortition executor, a block data store, etc.).

The control plane may initially include two blockchains. In general, a blockchain is a global append-only log. Writes to the global append-only log are called transactions, and transactions are organized into blocks. Thus, each block can include or package a single transaction or multiple transactions. Writing to the global append-only log (e.g., writing to a block) may require a payment in the form of a transaction fee. Nodes (e.g., virtual chain nodes 120 and/or miner devices 122) participating in the blockchain network follow a leader election protocol (e.g., a single-leader election protocol) for deciding which miner gets to write the next block in the blockchain. The miner that gets to write the next block in the blockchain may be awarded a block reward (e.g., in the form of cryptocurrency) and can collect the transaction fees for the transactions that will be written to this next block.

The first blockchain in the control plane is a burn chain, and the second blockchain in the control plane is a virtual chain (also referred to herein as a "stack chain") that relies on the burn chain. For example, the burn chain may be an existing blockchain, such as a BITCOIN blockchain, an ETHEREUM blockchain, etc. The burn chain may include one or more burn chain blocks 130, where each burn chain block 130 references a parent of the burn chain block 130. Thus, the burn chain blocks 130 may form a chain of blocks, with each burn chain block 130 encoding one or more transactions corresponding to the burn chain.

The virtual chain may be referred to as a "virtual chain" because the virtual chain may reside or lay on top of the burn chain. The virtual chain may include one or more virtual chain blocks 132 that are each anchored to a burn chain block 130. Like the burn chain blocks 130, the virtual chain blocks 132 may reference a parent block and therefore form a chain of blocks, and the virtual chain blocks 132 may each encode one or more transactions corresponding to the virtual chain. However, the burn chain may have a first cryptocurrency base (e.g., transactions are executed in the burn chain using the first cryptocurrency), and the virtual chain may have a different, second cryptocurrency base (e.g., transactions are executed in the virtual chain using the second cryptocurrency). While the virtual chain blocks 132 and the burn chain blocks 130 form separate blockchains, the formation of a virtual chain block 132 may rely on transactions encoded in the burn chain blocks 130. For example, a VM instance can use one or more transactions encoded in the burn chain blocks 130 to determine the leader of the next virtual chain block 132, as described in greater detail below.

If a virtual chain node 120 or miner device 122 determines that chain mitosis should occur with respect to the virtual chain, a third blockchaing—called an "app chain" or "application chain"—may be formed in the control plane. The app chain may include one or more app chain blocks 134 that are each anchored to a virtual chain block 132. Like the burn chain blocks 130 and the virtual chain blocks 132, the app chain blocks 134 may reference a parent block and therefore form a chain of blocks, and the app chain blocks 134 may each encode one or more transactions corresponding to the app chain. However, the app chain may be associated with a single application such that the transactions encoded in each app chain block 134 may only be transactions of the single application. While the app chain blocks 134 and the virtual chain blocks 132 form separate blockchains, the formation of a app chain block 134 may rely on transactions encoded in the virtual chain blocks 132. For example, a VM instance can use one or more transactions encoded in the virtual chain blocks 132 to determine the leader of the next app chain block 134, as described in greater detail below.

The control plane can include additional blockchains. For example, the control plane can include additional app chains, with each app chain being associated with a different application. As another example, the control plane can include split app chains that form from splitting an app chain. In general, the control plane can include any number of app chains, split app chains, chains that form from split app chains, chains that form from chains that form from split app chains, and so on.

The burn chain blocks 130, the virtual chain blocks 132, the app chain blocks 134, and any other blocks in the control plane may each be data structures comprised of a block header and transaction data. The block header may include various data, such as a reference to the immediately preceding block in the blockchain (e.g., a reference to the parent of the block, where the reference may be a hash of the header of the immediately preceding block in the blockchain), a Merkle root (e.g., a hash of all the hashes of the transactions stored in the block), a VRF proof, and/or a timestamp.

Figure 2A:
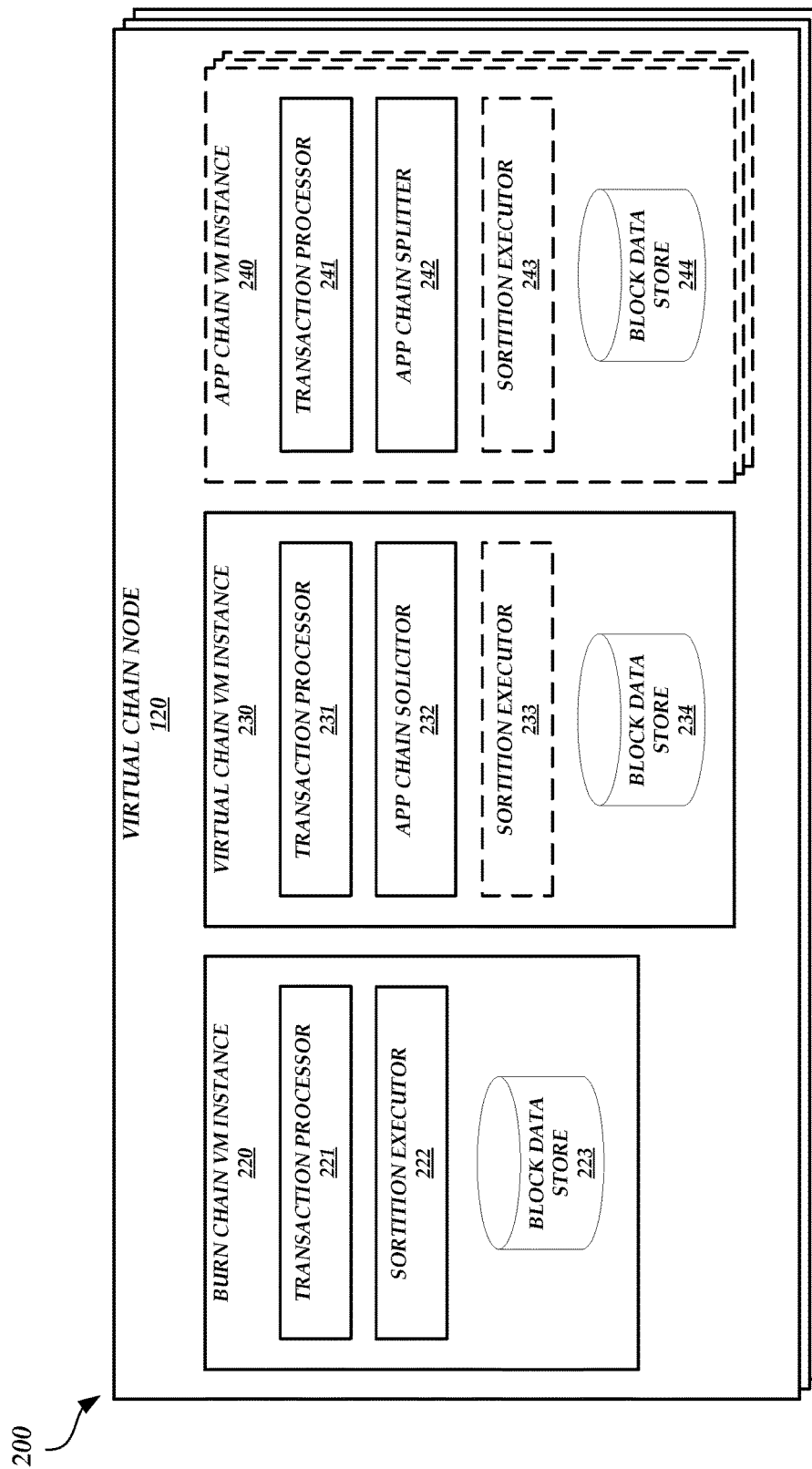
FIG. 2A is a block diagram of an illustrative operating environment in which an improved blockchain is implemented via one or more VM instances.

FIG. 2A is a block diagram of an illustrative operating environment 200 in which an improved blockchain is implemented via one or more VM instances 220, 230, and/or 240. The operating environment 200 includes various virtual chain nodes 120, some or all of which may communicate with each other via a network. The network may include any wired network, wireless network, or combination thereof. For example, the network may be a personal area network, local area network, wide area network, over-the-air broadcast network (e.g., for radio or television), cable network, satellite network, cellular telephone network, or combination thereof. As a further example, the network may be a publicly accessible network of linked networks, possibly operated by various distinct parties, such as the Internet. In some embodiments, the network may be a private or semi-private network, such as a corporate or university intranet. The network may include one or more wireless networks, such as a Global System for Mobile Communications (GSM) network, a Code Division Multiple Access (CDMA) network, a Long Term Evolution (LTE) network, or any other type of wireless network. The network can use protocols and components for communicating via the Internet or any of the other aforementioned types of networks. For example, the protocols used by the network may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

As described above, each virtual chain node 120 can launch and execute one or more VM instances 220, 230, and/or 240. The VM instance 220 may be a burn chain VM instance (e.g., a VM instance that tracks the burn chain) that includes various components to implement the improved blockchain described herein. For example, the burn chain VM instance 220 may include a transaction processor 221, a sortition executor 222, and a block data store 223.

The VM instance 230 may be a virtual chain VM instance (e.g., a VM instance that tracks the virtual chain) that includes various components to implement the improved blockchain described herein. For example, the virtual chain VM instance 230 may include a transaction processor 231, an app chain solicitor 232, a sortition executor 233, and a block data store 234.

The VM instance(s) 240 may be app chain VM instance(s) (e.g., VM instance(s) that each track a different app chain) that each include various components to implement the improved blockchain described herein. For example, the app chain VM instance(s) 240 may each include a transaction processor 241, an app chain splitter 242, a sortition executor 243, and a block data store 244.

The transaction processor 221 can broadcast and/or receive various messages indicating that a transaction has been stored or executed. For example, the transaction processor 221 can broadcast that a miner device 122 has submitted a public key registration transaction and/or a block commit transaction, that a user's wallet or application device 124 has submitted a transaction for storage in a burn chain block 130, and so on.

The sortition executor 222 can perform a single-leader election. For example, a miner device 122 can qualify to become a leader of the next block in the virtual chain 132 if the miner device 122 submits a public key registration transaction in a burn chain block 130 that precedes a burn chain block 130 at which the election occurs. The public key registration transaction may include a public key of the miner device 122, which can later be used to validate a future virtual chain 132 block if the miner device 122 is chosen as a leader of the block. The transaction processor 221 may have received messages indicating that one or more miner devices 122 have submitted public key registration transactions and have submitted block commit transactions in association with a particular burn chain block 130, with the messages including the corresponding transaction data. The sortition executor 222 can use the transaction data to determine a probability associated with each miner device 122 that submitted a block commit transaction in association with the particular burn chain block 130. In particular, the block commit transaction data may indicate an amount of a cryptocurrency burned by each miner device 122 that submitted a block commit transaction in association with the particular burn chain block 130. Optionally, the sortition executor 222 can sum the total amount of cryptocurrency burned by each miner device 122 that submitted a block commit transaction in association with the particular burn chain block 130. The sortition executor 222 can then compare the sum to a burn quota. If the sum is equal to or exceeds the burn quota, the sortition executor 222 continues with the sortition. However, if the sum is less than the burn quota, the sortition executor 222 stops and no sortition occurs in association with the particular burn chain block 130. Rather, a sortition may occur in association with a subsequent burn chain block 130, as described in greater detail below. Having the occurrence of a sortition be dependent on whether the sum is equal to or exceeds the burn quota is optional, as a sortition can occur regardless of whether the sum would be equal to or exceed the burn quota.

If the sortition executor 222 sums the total amount of cryptocurrency burned, compares the sum to the burn quota, and determines that the sum is equal to or exceeds the burn quota or once the sum is complete (e.g., if the burn quota is not used to control sortition occurrence), the sortition executor 222 then determines the percentage of the sum that was burned by each of the miner device(s) 122 that submitted a block commit transaction. The sortition executor 222 can assign each miner device 122 the determined percentage, which represents the likelihood that the respective miner device 122 will be selected as the leader of the next virtual chain block 132.

The sortition executor 222 can generate a value that is used to select the leader of the next virtual chain block 132. The value may fall within a certain range, such as 0 to $2^{256}-1$ if 256 bit encryption is being used. Because the value can fall within a certain range, the sortition executor 222 can assign different portions or intervals of the range to the miner device(s) 122 that submitted the block commit transaction in association with the particular burn chain block 130. The percentage of the range assigned to a miner device 122 may be equivalent to a percentage of the sum that was burned by the miner device 122. The range assigned to the miner device 122 can be contiguous or non-contiguous. For example, if a miner device 122 burned 20% of the sum, the sortition executor 222 may assign the miner device 122 20% of the range. The sortition executor 222 can assign the miner device 122 the first 20% of the range, the last 20% of the range, a middle 20% of the range, 10% of the first half of the range and 10% of the second half of the range, and/or the like. The portion of a range to assign to a miner device 122 may be defined by a rule stored in the block data store 223.

To generate the value, the sortition executor 222 can first sum a message (e.g., a hash of a VRF proof present in the header of a previous virtual chain block 132) and a proof of work nonce obtained from the header of the burn chain block 130 within which the block commit transactions that led to this sortition are stored. Alternatively, the sortition executor 222 can hash or otherwise combine the message and the proof of work nonce obtained from the header of the burn chain block 130 within which the block commit transactions that led to this sortition are stored. Once combined, the sortition executor 222 can compute the combination modulo $2^{256}-1$ to generate the value. The modulo operation may ensure that the generated value does not fall outside the 0 to $2^{256}-1$ range and can obscure the resulting value that will be used to select the leader. The sortition executor 222 then selects the miner device 122 assigned to the portion of the range within which the generated value falls as the leader of the next virtual chain block 132, where the next virtual chain block 132 will be anchored to the burn chain block 130 for which the sortition was conducted. The sortition executor 222 or another component (e.g., the transaction processor 221) can provide a block reward to the selected miner device 122 (e.g., by storing a transaction indicating that the block reward has been sent to the selected miner device 122).

Additional details of the operations performed by a sortition executor 222 to perform a single-leader election are described in U.S. patent application Ser. No. 16/424,158, entitled "CRYPTOCURRENCY MINING USING A SINGLE-LEADER ELECTION ALGORITHM" and filed on May 28, 2019, which is hereby incorporated by reference herein in its entirety.

The block data store 223 can store burn chain block 130 data. For example, the block data store 223 can store a first table that includes public keys announced by various miner devices 122 via public key registration transactions and the burn chain block 130 at which the public keys were announced (e.g., at which the public key registration transaction is stored). The transaction processor 221 can update the first table each time a new public key registration transaction is received via the network from one or more other virtual chain nodes 120 and/or miner devices 122. The block data store 223 can further store a second table corresponding to the block commit transactions submitted by various miner devices 122. Each row in the second table can correspond to a block commit transaction, with each row including a VRF proof (or a hash of a VRF proof) generated by the miner device 122 that submitted the block commit transaction, an amount of cryptocurrency burned via the block commit transaction, and the burn chain block 130 at which the block commit transaction is stored. The transaction processor 221 can update the second table each time a new block commit transaction is received via the network from one or more other virtual chain nodes 120 and/or miner devices 122. The block data store 223 can further store a third table identifying the IP addresses of miner devices 122 that have submitted a block commit transaction and/or times at which the IP addresses will expire or no longer be considered valid. The miner devices 122 may indicate their IP addresses in public key registration transactions, in block commit transactions, and/or in separate IP address registration transactions. The transaction processor 221 can update the third table each time a public key registration transaction, a block commit transaction, and/or a separate IP address registration transaction is received via the network from one or more other virtual chain nodes 120 and/or miner devices 122. While the block data store 223 is depicted as being internal to the burn chain VM instance 220, this is not meant to be limiting. For example, the block data store 223 may reside internal to the virtual chain node 120, but external to the burn chain VM instance 220. In this example, the VM instances 220, 230, and/or 240 may share access to the block data store 223.

The transaction processor 231 can perform functions similar to the transaction processor 221. For example, the transaction processor 231 can broadcast and/or receive various messages indicating that a transaction has been stored or executed. For example, the transaction processor 231 can broadcast that a user's wallet or application device 124 has submitted a transaction for storage in a virtual chain block 132 (e.g., a transaction corresponding to a particular application), that a miner device 122 has submitted a public key registration transaction and/or a block commit transaction (e.g., which transactions may be allowed once the proof of burn code of the virtual chain VM instance 230 is enabled), and so on.

In addition, the transaction processor 231 (or the app chain solicitor 232) can track the volume of transactions received from specific applications. If the transaction processor 231 (or app chain solicitor 232) determines that the percentage of all virtual computing resources (e.g., virtual CPU, virtual memory, virtual network bandwidth, etc.) expended by the virtual chain VM instance 230 or the percentage of all physical computing resources (e.g., CPU, memory, network bandwidth, etc.) expended by the virtual chain node 120 to process transactions of a particular application for a virtual chain block 132 exceeds a threshold and that this threshold has been exceeded for one or more consecutive virtual chain blocks 132, then the transaction processor 231 (or app chain solicitor 232) determines that a new app chain should be formed for this application. Alternatively or in addition, the transaction processor 231 (or app chain solicitor 232) can use other factor(s) to determine when the new app chain should be formed. For example, the transaction processor 231 (or app chain solicitor 232) can determine that a new app chain should be formed if at least a set amount of virtual or physical computing resources are allocated to processing transactions of a particular application for a virtual chain block 132 and that this set amount has been equaled or exceeded for one or more consecutive virtual chain blocks 132, if at least a set percentage of all transactions in a virtual chain block 132 are transactions of a particular application and this set amount has been equaled or exceeded for one or more consecutive virtual chain blocks 132, if at least a set number of transactions of a particular application are stored in a virtual chain block 132 and this set amount has been equaled or exceeded for one or more consecutive virtual chain blocks 132, and/or the like. Alternatively or in addition, the transaction processor 231 (or app chain solicitor 232) can determine that the new app chain should be formed if the threshold or set amount is equaled or exceeded for at least a threshold number of the last N virtual chain blocks 132. The factors that determine if a new app chain should be formed may be defined in the smart contract code of the application. The memory of the virtual chain node 120 (e.g., a data store, not shown, and/or the block data store 234) can store smart contract code and/or proof of burn code for one or more applications.

Once the transaction processor 231 (or the app chain solicitor 232) determines that a new app chain should be formed, the virtual chain VM instance 230 enters a pre-fork stage and the app chain solicitor 232 can transmit a message to other virtual chain node(s) 120 and/or miner device(s) 122 in the decentralized network soliciting miners to act as initial miners for the new app chain to be formed. The message may indicate the application associated with the new app chain to be formed and/or may request IP addresses of miners interested in being initial miners for the new app chain. A miner device 122 can respond to the solicitation by transmitting an IP address registration transaction to some or all of the virtual chain node(s) 120 and/or miner device(s) 122 that includes an IP address of the miner device 122 and/or a time until which the IP address is valid. The app chain solicitor 232 (or the transaction processor 231) can receive the IP address registration transactions and store the IP addresses in a table in the block data store 234. Thus, the block data store 234 may store a table that includes the IP addresses of all of the initial miners for the new app chain to be formed.

Alternatively or in addition, the message transmitted by the app chain solicitor 232 to other virtual chain node(s) 120 and/or miner device(s) 122 in the decentralized network solicits peers to act as initial peers for the new app chain to be formed. The message may indicate the application associated with the new app chain to be formed and/or may request IP addresses of peers interested in being initial peers for the new app chain. A virtual chain node 120 or miner device 122 can respond to the solicitation by transmitting an IP address registration transaction to some or all of the virtual chain node(s) 120 and/or miner device(s) 122 that includes an IP address of the virtual chain node 120 or miner device 122 and/or a time until which the IP address is valid. The app chain solicitor 232 (or the transaction processor 231) can receive the IP address registration transactions and store the IP addresses in a table in the block data store 234. Thus, the block data store 234 may store a table that includes the IP addresses of all of the initial peers for the new app chain to be formed, which allows peers to identify other peers to communicate with to process the new app chain to be formed.

As described herein, the smart contract code of all applications is initially enabled and executed by the virtual chain VM instance 230. The smart contract code for an application may define how many blocks in the virtual chain should be formed after peers and/or miners are solicited before a fork occurs to split the virtual chain into the virtual chain and a new app chain. For example, the smart contract code may define that 3 blocks in the virtual chain should be formed after peers and/or miners are solicited in a virtual chain block 132 before a fork occurs to split the virtual chain into the virtual chain and a new app chain. Before, during, and/or after the virtual chain block 132 prior to the block at which the fork is to occur is formed, the virtual chain VM instance 230 (or the virtual chain node 120 itself) disables the smart contract code for the application associated with the new app chain to be formed (such that the functions defined by the smart contract code are no longer invokable by an application device 124, a user's wallet, etc.) and enables the proof of burn code for the application associated with the new app chain to be formed. As a result of enabling the proof of burn code for the application, the virtual chain VM instance 230 can begin to perform sortitions to elect leaders of new blocks in the app chain. Specifically, the sortition executor 233 of the virtual chain VM instance 230 can begin performing sortitions to elect leaders of new blocks in the app chain. Thus, the sortition executor 233 may be disabled until the proof of burn code is enabled.

The sortition executor 233 can perform single-leader elections to select leaders of new blocks in the app chain in a manner as described herein. For example, the sortition executor 233 can perform the operations described herein as being performed by the sortition executor 222 to perform the single-leader elections.

The block data store 234 can store virtual chain block 132 data. For example, the block data store 234 can store a first table that includes public keys announced by various miner devices 122 via public key registration transactions once at least one app chain is formed and the virtual chain block 132 at which the public keys were announced (e.g., at which the public key registration transaction is stored). The transaction processor 231 can update the first table each time a new public key registration transaction is received via the network from one or more other virtual chain nodes 120 and/or miner devices 122. The block data store 234 can further store a second table corresponding to the block commit transactions submitted by various miner devices 122 once at least one app chain is formed. Each row in the second table can correspond to a block commit transaction, with each row including a VRF proof (or a hash of a VRF proof) generated by the miner device 122 that submitted the block commit transaction, an amount of cryptocurrency burned via the block commit transaction, an app chain for which the block commit transaction is submitted, and the virtual chain block 132 at which the block commit transaction is stored. The transaction processor 231 can update the second table each time a new block commit transaction is received via the network from one or more other virtual chain nodes 120 and/or miner devices 122. The block data store 234 can further store a third table identifying the IP addresses of miner devices 122 that registered as initial miners of an app chain and/or that have submitted a block commit transaction and/or times at which the IP addresses will expire or no longer be considered valid, and/or the IP addresses of virtual chain nodes 120 or miner devices 122 that registered as initial peers of an app chain and/or times at which the IP addresses will expire or no longer be considered valid. The miner devices 122 may indicate their IP addresses in public key registration transactions, in block commit transactions, and/or in separate IP address registration transactions, and the peers may indicate their IP addresses in separate IP address registration transactions. The transaction processor 231 can update the third table each time a public key registration transaction, a block commit transaction, and/or a separate IP address registration transaction is received via the network from one or more other virtual chain nodes 120 and/or miner devices 122. While the block data store 234 is depicted as being internal to the virtual chain VM instance 230, this is not meant to be limiting. For example, the block data store 234 may reside internal to the virtual chain node 120, but external to the virtual chain VM instance 230. In this example, the VM instances 220, 230, and/or 240 may share access to the block data store 234.

The transaction processor 241 can perform functions similar to the transaction processors 221 and 231. For example, the transaction processor 241 can broadcast and/or receive various messages indicating that a transaction has been stored or executed. For example, the transaction processor 241 can broadcast that a user's wallet or application device 124 has submitted a transaction for storage in an app chain block 134 (e.g., a transaction corresponding to a particular application), that a miner device 122 has submitted a public key registration transaction and/or a block commit transaction (e.g., which transactions may be allowed once the proof of burn code of the app chain VM instance 240 is enabled), and so on.

In addition, the transaction processor 241 (or the app chain splitter 242) can track the volume of transactions received for the application associated with the app chain. If the transaction processor 241 (or app chain splitter 242) determines that at least a set number of (consecutive or non-consecutive) blocks have been formed in the app chain that each include at least a threshold number of transactions corresponding to the application associated with the app chain, then the transaction processor 241 (or app chain splitter 242) determines that the app chain should be split such that the original app chain converts into an app burn chain and one or more new split app chains are formed. The factors that determine if an app chain should be split may be defined in the smart contract code executed by the app chain VM instance 240. The memory of the virtual chain node 120 (e.g., a data store, not shown, and/or the block data store 244) can store the smart contract code and/or the proof of burn code.

Once the transaction processor 241 (or the app chain splitter 242) determines that the app chain should be split, the app chain VM instance 240 enters a pre-fork stage and the app chain splitter 242 optionally transmits a message to other virtual chain node(s) 120 and/or miner device(s) 122 in the decentralized network soliciting miners to act as initial miners for the new split app chain(s) to be formed. The message may request IP addresses of miners interested in being initial miners for a new split app chain. A miner device 122 can respond to the solicitation by transmitting an IP address registration transaction to some or all of the virtual chain node(s) 120 and/or miner device(s) 122 that includes an IP address of the miner device 122 and/or a time until which the IP address is valid. The app chain splitter 242 (or the transaction processor 241) can receive the IP address registration transactions and store the IP addresses in a table in the block data store 244. Thus, the block data store 244 may store a table that includes the IP addresses of all of the initial miners for the new split app chain(s) to be formed.

Alternatively or in addition, the message transmitted by the app chain splitter 242 to other virtual chain node(s) 120 and/or miner device(s) 122 in the decentralized network solicits peers to act as initial peers for the new split app chain(s) to be formed. The message may request IP addresses of peers interested in being initial peers for a new split app chain. A virtual chain node 120 or miner device 122 can respond to the solicitation by transmitting an IP address registration transaction to some or all of the virtual chain node(s) 120 and/or miner device(s) 122 that includes an IP address of the virtual chain node 120 or miner device 122 and/or a time until which the IP address is valid. The app chain splitter 242 (or the transaction processor 241) can receive the IP address registration transactions and store the IP addresses in a table in the block data store 244. Thus, the block data store 244 may store a table that includes the IP addresses of all of the initial peers for the new split app chain(s) to be formed, which allows peers to identify other peers to communicate with to process the new split app chain(s) to be formed.

As described herein, the smart contract code of all applications is initially enabled and executed by the app chain VM instance 240. The smart contract code may define how many blocks in the app chain should be formed after peers and/or miners are solicited before a fork occurs to split the virtual chain into an app burn chain and one or more split app chains. For example, the smart contract code may define that 3 blocks in the app chain should be formed after peers and/or miners are solicited in an app chain block 134 before a fork occurs to split the app chain into the app burn chain and the split app chain(s). Before, during, and/or after the app chain block 134 prior to the block at which the split is to occur is formed, the app chain VM instance 240 (or the virtual chain node 120 itself) disables the smart contract code (such that the functions defined by the smart contract code are no longer invokable by an application device 124, a user's wallet, etc.) and enables the proof of burn code. As a result of enabling the proof of burn code, the app chain splitter 242 can transition the app chain into an app burn chain in which only proof of burn transactions are stored. In other words, the app chain splitter 242 causes future blocks in the app chain to no longer accept application transactions and to only accept proof of burn transactions. Rather, such transactions will be stored in one of the newly formed split app chain(s). In addition, as a result of enabling the proof of burn code, the app chain VM instance 240 can begin to perform sortitions to elect leaders of new blocks in one or split app chains. Specifically, the sortition executor 243 of the app chain VM instance 240 can begin performing individual sortitions for each split app chain to elect leaders of new blocks in the respective split app chain. Thus, the sortition executor 243 may be disabled until the proof of burn code is enabled.

The sortition executor 243 can perform single-leader elections to select leaders of new blocks in the app chain in a manner as described herein. For example, the sortition executor 243 can perform the operations described herein as being performed by the sortition executors 222 and 233 to perform the single-leader elections.

The block data store 244 can store app chain block 134 data. For example, the block data store 244 can store a first table that includes public keys announced by various miner devices 122 via public key registration transactions once at least one split app chain is formed and the app chain block 134 at which the public keys were announced (e.g., at which the public key registration transaction is stored). The transaction processor 241 can update the first table each time a new public key registration transaction is received via the network from one or more other virtual chain nodes 120 and/or miner devices 122. The block data store 244 can further store a second table corresponding to the block commit transactions submitted by various miner devices 122 once at least one split app chain is formed. Each row in the second table can correspond to a block commit transaction, with each row including a VRF proof (or a hash of a VRF proof) generated by the miner device 122 that submitted the block commit transaction, an amount of cryptocurrency burned via the block commit transaction, an app chain for which the block commit transaction is submitted, and the app chain block 134 at which the block commit transaction is stored. The transaction processor 241 can update the second table each time a new block commit transaction is received via the network from one or more other virtual chain nodes 120 and/or miner devices 122. The block data store 244 can further store a third table identifying the IP addresses of miner devices 122 that registered as initial miners of a split app chain and/or that have submitted a block commit transaction and/or times at which the IP addresses will expire or no longer be considered valid, and/or the IP addresses of virtual chain nodes 120 or miner devices 122 that registered as initial peers of a split app chain and/or times at which the IP addresses will expire or no longer be considered valid. The miner devices 122 may indicate their IP addresses in public key registration transactions, in block commit transactions, and/or in separate IP address registration transactions, and the peers may indicate their IP addresses in separate IP address registration transactions. The transaction processor 241 can update the third table each time a public key registration transaction, a block commit transaction, and/or a separate IP address registration transaction is received via the network from one or more other virtual chain nodes 120 and/or miner devices 122. While the block data store 244 is depicted as being internal to the app chain VM instance 240, this is not meant to be limiting. For example, the block data store 244 may reside internal to the virtual chain node 120, but external to the app chain VM instance 240. In this example, the VM instances 220, 230, and/or 240 may share access to the block data store 244.

Figure 2B:
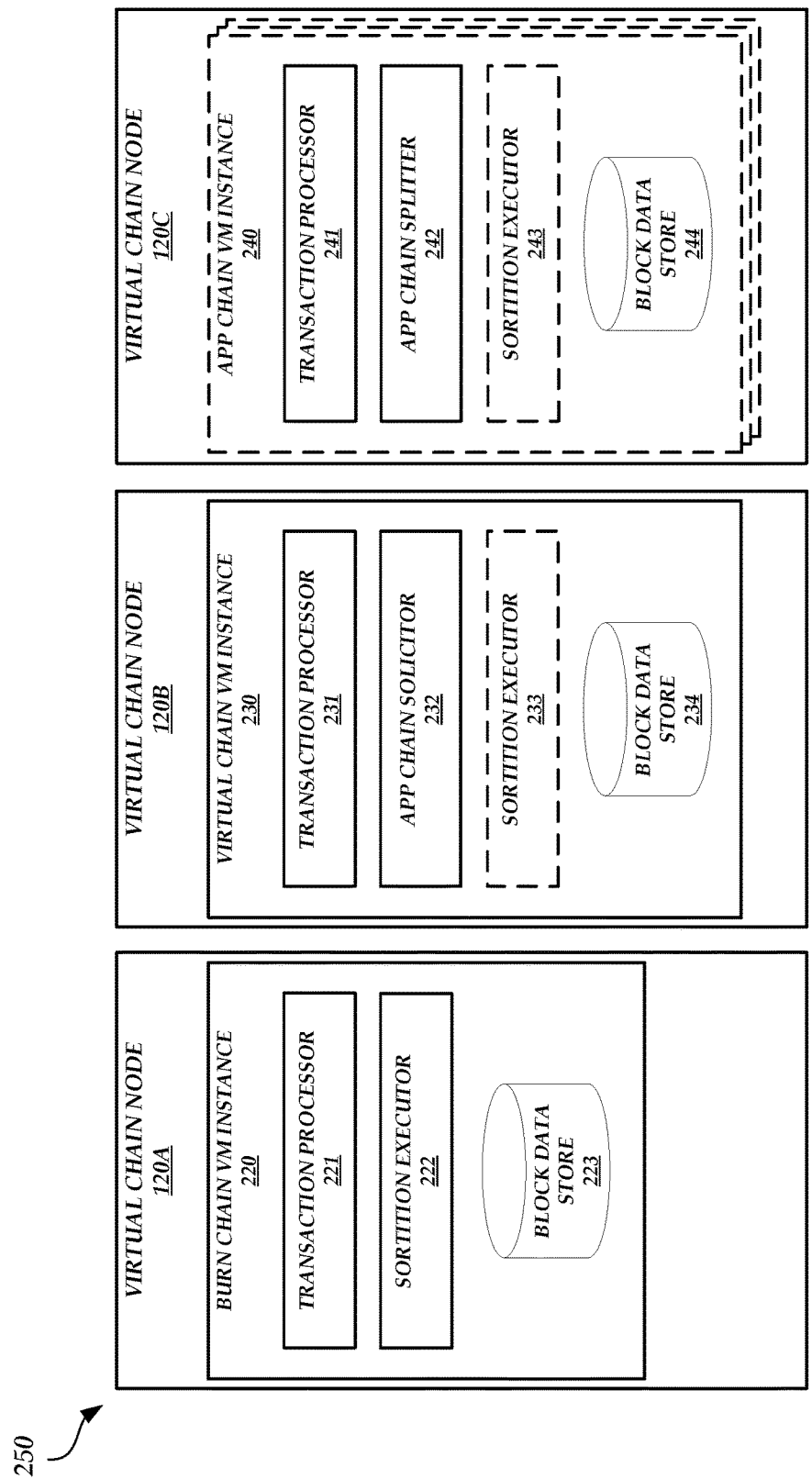
FIG. 2B is another block diagram of an illustrative operating environment in which an improved blockchain is implemented via one or more VM instances.

FIG. 2B is another block diagram of an illustrative operating environment 250 in which an improved blockchain is implemented via one or more VM instances 220, 230, and/or 240. The operating environment 250 is similar to the operating environment 200, except that each VM instance 220, 230, and 240 is initialized by a different virtual chain node 120A-120C. While the VM instances 220, 230, and 240 may be running in different virtual chain nodes 120A-120C, the VM instances 220, 230, and/or 240 may nonetheless be configured to communicate with one another.

Figure 3A:
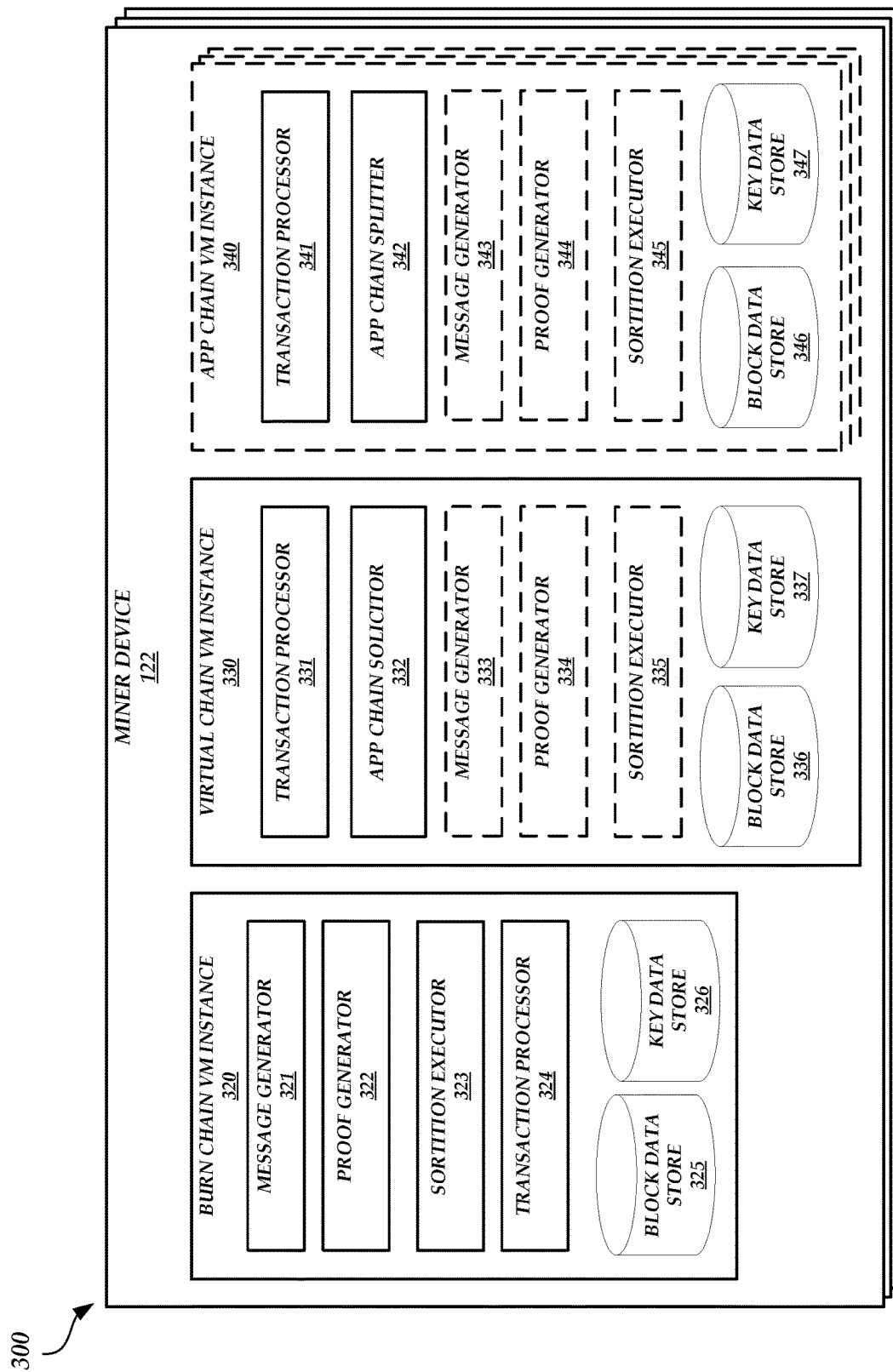
FIG. 3A is a block diagram of an illustrative operating environment in which an improved blockchain is implemented via one or more VM instances.

FIG. 3A is a block diagram of an illustrative operating environment 300 in which an improved blockchain is implemented via one or more VM instances 320, 330, and/or 340. The operating environment 300 includes various miner devices 130, some or all of which may communicate with each other via the network.

As described above, each miner device 122 can launch and execute one or more VM instances 320, 330, and/or 340. The VM instance 320 may be a burn chain VM instance (e.g., a VM instance that mines blocks in the burn chain, that participates in burn chain sortitions to be able to mine virtual chain blocks 132, and/or that tracks the burn chain) that includes various components to implement the improved blockchain described herein. For example, the burn chain VM instance 320 may include a message generator 321, a proof generator 322, a sortition executor 323, a transaction processor 324, a block data store 325, and a key data store 326.

The VM instance 330 may be a virtual chain VM instance (e.g., a VM instance that mines blocks in the virtual chain, that participates in virtual chain sortitions to be able to mine app chain blocks 134, and/or that tracks the virtual chain) that includes various components to implement the improved blockchain described herein. For example, the virtual chain VM instance 330 may include a transaction processor 331, an app chain solicitor 332, a message generator 333, a proof generator 334, a sortition executor 335, a block data store 336, and a key data store 337.

The VM instance(s) 340 may be app chain VM instance(s) (e.g., VM instance(s) that each mine blocks in the app chain, that each participate in app chain sortitions to be able to mine split app chain blocks, and/or that each track a different app chain) that each include various components to implement the improved blockchain described herein. For example, the app chain VM instance(s) 340 may each include a transaction processor 341, an app chain splitter 342, a message generator 343, a proof generator 344, a sortition executor 345, a block data store 346, and a key data store 347.

The burn chain VM instance 320 may be similar to the burn chain VM instance 220, except the burn chain VM instance 320 can implement miner functionality. For example, the message generator 321 may generate a message that is eventually used to derive a VRF proof for the burn chain VM instance 320. For example, the message generator 321 may generate the message by hashing a VRF proof present in a previous block in the virtual chain (e.g., a block that may become a parent to a new block to be formed in the virtual chain). In particular, the VRF proof of the previous block in the virtual chain may be present in the header of the previous block. The message generator 321 may obtain the VRF proof of the previous block by retrieving the data structure of the previous block from the block data store 325 and obtaining the VRF proof from the header portion of the data structure.

The proof generator 322 can generate a VRF proof for the burn chain VM instance 320. For example, the proof generator 322 can obtain a private key of the burn chain VM instance 320 from the key data store 326, and can use the message and the obtained private key to generate the VRF proof. Because the VRF proof is based, at least in part, on the private key, the VRF proof of each burn chain VM instance 320 should be different. In addition, because the VRF proof is based, at least in part, on the message (and therefore the VRF proof of a previous block), each separate VRF proof generated by the proof generator 322 should be different. In general, the proof generator 322 may generate a new VRF proof each time the burn chain VM instance 320 is attempting to submit a block commit transaction in association with a different block in the burn chain.

The sortition executor 323 can perform single-leader elections to select leaders of new blocks in the virtual chain in a manner as described herein. For example, the sortition executor 323 can perform the operations described herein as being performed by the sortition executors 222, 233, and 243 to perform the single-leader elections.

The transaction processor 324 can perform similar operations as the transaction processor 221 of FIGS. 2A-2B. In addition, the transaction processor 324 can submit public key registration transactions, block commit transactions, and/or any other transactions on behalf of the burn chain VM instance 320. The transaction processor 324 can generate the transactions (e.g., by obtaining data from other components), specifying a public key of the burn chain VM instance 320 (e.g., for public key registration transactions), an amount of cryptocurrency that is burned (e.g., for block commit transactions), a burn chain block 130 associated with the transaction (e.g., for a public key registration transaction, a block commit transaction, etc.), and/or the like.

The transaction processor 324 can also process block rewards received as a result of the burn chain VM instance 320 being selected to form a burn chain block 130. The transaction processor 324 may also process transaction fees received as a result of the burn chain VM instance 320 being selected to form a burn chain block 130.

The block data store 325 can store burn chain block 130 data, similar to the block data store 223 of FIGS. 2A-2B. While the block data store 325 is depicted as being internal to the burn chain VM instance 320, this is not meant to be limiting. For example, the block data store 325 may reside internal to the miner device 122, but external to the burn chain VM instance 320. In this example, the VM instances 320, 330, and/or 340 may share access to the block data store 325.

The key data store 326 can store public and private keys of the burn chain VM instance 320. While the key data store 326 is depicted as being internal to the burn chain VM instance 320, this is not meant to be limiting. For example, the key data store 325 may reside internal to the miner device 122, but external to the burn chain VM instance 320. In this example, the VM instances 320, 330, and/or 340 may share access to the key data store 325, and the key data store 325 may store public and private keys for each of the VM instances 320, 330, and/or 340.

While the burn chain VM instance 320 is described herein as implementing the functionality of a miner and a peer, this is not meant to be limiting. For example, the burn chain VM instance 320 can simply implement the functionality of a miner (e.g., not include the sortition executor 323 and/or some of the functionality of the transaction processor 324) and obtain blockchain data from other virtual chain node(s) 120 and/or miner device(s) 122.

The virtual chain VM instance 330 may be similar to the virtual chain VM instance 230, except the virtual chain VM instance 330 can implement miner functionality. For example, the transaction processor 331 can perform similar operations as the transaction processor 231 of FIGS. 2A-2B. In addition, the transaction processor 331 can submit public key registration transactions (e.g., after a determination is made to form a new app chain), block commit transactions (e.g., after a determination is made to form a new app chain), and/or any other transactions on behalf of the virtual chain VM instance 330. The transaction processor 331 can generate the transactions (e.g., by obtaining data from other components), specifying a public key of the virtual chain VM instance 330 (e.g., for public key registration transactions), an amount of cryptocurrency that is burned (e.g., for block commit transactions), a virtual chain block 132 associated with the transaction (e.g., for a public key registration transaction, a block commit transaction, etc.), and/or the like.

The transaction processor 331 can also process block rewards received as a result of the virtual chain VM instance 330 being selected as a leader of a virtual chain block 132. The transaction processor 331 may also process transaction fees received as a result of the virtual chain VM instance 330 being selected as a leader of a virtual chain block 132.

The app chain solicitor 332 can perform similar operations as the app chain solicitor 232 of FIGS. 2A-2B.

The message generator 333 may generate a message that is eventually used to derive a VRF proof for the virtual chain VM instance 330. The message generator 333 may operate once the proof of burn code for an application is enabled for execution by the virtual chain VM instance 330. For example, the message generator 333 may generate the message by hashing a VRF proof present in a previous block in an app chain (e.g., a block that may become a parent to a new block to be formed in an app chain). In particular, the VRF proof of the previous block in the app chain may be present in the header of the previous block. The message generator 333 may obtain the VRF proof of the previous block by retrieving the data structure of the previous block from the block data store 336 and obtaining the VRF proof from the header portion of the data structure.

The proof generator 334 can generate a VRF proof for the virtual chain VM instance 330. The proof generator 334 may operate once the proof of burn code for an application is enabled for execution by the virtual chain VM instance 330. For example, the proof generator 334 can obtain a private key of the virtual chain VM instance 330 from the key data store 337, and can use the message and the obtained private key to generate the VRF proof. Because the VRF proof is based, at least in part, on the private key, the VRF proof of each virtual chain VM instance 330 should be different. In addition, because the VRF proof is based, at least in part, on the message (and therefore the VRF proof of a previous block), each separate VRF proof generated by the proof generator 333 should be different. In general, the proof generator 333 may generate a new VRF proof each time the virtual chain VM instance 330 is attempting to submit a block commit transaction in association with a different block in the virtual chain.

The sortition executor 335 can perform single-leader elections to select leaders of new blocks in an app chain in a manner as described herein. For example, the sortition executor 335 can perform the operations described herein as being performed by the sortition executors 222, 233, and 243 to perform the single-leader elections.

The block data store 336 can store virtual chain block 132 data, similar to the block data store 234 of FIGS. 2A-2B. While the block data store 336 is depicted as being internal to the virtual chain VM instance 330, this is not meant to be limiting. For example, the block data store 336 may reside internal to the miner device 122, but external to the virtual chain VM instance 330. In this example, the VM instances 320, 330, and/or 340 may share access to the block data store 336.

The key data store 337 can store public and private keys of the virtual chain VM instance 330. While the key data store 337 is depicted as being internal to the virtual chain VM instance 330, this is not meant to be limiting. For example, the key data store 337 may reside internal to the miner device 122, but external to the virtual chain VM instance 330. In this example, the VM instances 320, 330, and/or 340 may share access to the key data store 337, and the key data store 337 may store public and private keys for each of the VM instances 320, 330, and/or 340.

While the virtual chain VM instance 330 is described herein as implementing the functionality of a miner and a peer, this is not meant to be limiting. For example, the virtual chain VM instance 330 can simply implement the functionality of a miner (e.g., not include the app chain solicitor 332, the sortition executor 335, and/or some of the functionality of the transaction processor 331) and obtain blockchain data from other virtual chain node(s) 120 and/or miner device(s) 122.

The app chain VM instance 340 may be similar to the app chain VM instance 240, except the app chain VM instance 340 can implement miner functionality. For example, the transaction processor 341 can perform similar operations as the transaction processor 241 of FIGS. 2A-2B. In addition, the transaction processor 341 can submit public key registration transactions (e.g., after a determination is made to form a new split app chain), block commit transactions (e.g., after a determination is made to form a new split app chain), and/or any other transactions on behalf of the app chain VM instance 340. The transaction processor 341 can generate the transactions (e.g., by obtaining data from other components), specifying a public key of the app chain VM instance 340 (e.g., for public key registration transactions), an amount of cryptocurrency that is burned (e.g., for block commit transactions), an app chain block 134 associated with the transaction (e.g., for a public key registration transaction, a block commit transaction, etc.), and/or the like.

The transaction processor 341 can also process block rewards received as a result of the app chain VM instance 340 being selected as a leader of an app chain block 134. The transaction processor 341 may also process transaction fees received as a result of the app chain VM instance 340 being selected as a leader of an app chain block 134.

The app chain splitter 342 can perform similar operations as the app chain splitter 242 of FIGS. 2A-2B.

The message generator 343 may generate a message that is eventually used to derive a VRF proof for the app chain VM instance 340. The message generator 343 may operate once the proof of burn code for an application is enabled for execution by the app chain VM instance 340. For example, the message generator 343 may generate the message by hashing a VRF proof present in a previous block in a split app chain (e.g., a block that may become a parent to a new block to be formed in a split app chain). In particular, the VRF proof of the previous block in the split app chain may be present in the header of the previous block. The message generator 343 may obtain the VRF proof of the previous block by retrieving the data structure of the previous block from the block data store 346 and obtaining the VRF proof from the header portion of the data structure.

The proof generator 344 can generate a VRF proof for the app chain VM instance 340. The proof generator 344 may operate once the proof of burn code for an application is enabled for execution by the app chain VM instance 340. For example, the proof generator 344 can obtain a private key of the app chain VM instance 340 from the key data store 347, and can use the message and the obtained private key to generate the VRF proof. Because the VRF proof is based, at least in part, on the private key, the VRF proof of each app chain VM instance 340 should be different. In addition, because the VRF proof is based, at least in part, on the message (and therefore the VRF proof of a previous block), each separate VRF proof generated by the proof generator 343 should be different. In general, the proof generator 343 may generate a new VRF proof each time the app chain VM instance 340 is attempting to submit a block commit transaction in association with a different block in the app chain.

The sortition executor 345 can perform single-leader elections to select leaders of new blocks in an app chain in a manner as described herein. For example, the sortition executor 345 can perform the operations described herein as being performed by the sortition executors 222, 233, and 243 to perform the single-leader elections.

The block data store 346 can store app chain block 134 data, similar to the block data store 244 of FIGS. 2A-2B. While the block data store 346 is depicted as being internal to the app chain VM instance 340, this is not meant to be limiting. For example, the block data store 346 may reside internal to the miner device 122, but external to the app chain VM instance 340. In this example, the VM instances 320, 330, and/or 340 may share access to the block data store 346.

The key data store 347 can store public and private keys of the app chain VM instance 340. While the key data store 347 is depicted as being internal to the app chain VM instance 340, this is not meant to be limiting. For example, the key data store 347 may reside internal to the miner device 122, but external to the app chain VM instance 340. In this example, the VM instances 320, 330, and/or 340 may share access to the key data store 347, and the key data store 347 may store public and private keys for each of the VM instances 320, 330, and/or 340.

While the app chain VM instance 340 is described herein as implementing the functionality of a miner and a peer, this is not meant to be limiting. For example, the app chain VM instance 340 can simply implement the functionality of a miner (e.g., not include the app chain splitter 342, the sortition executor 345, and/or some of the functionality of the transaction processor 341) and obtain blockchain data from other virtual chain node(s) 120 and/or miner device(s) 122. Accordingly, the functionality of the VM instances 320, 330, and/or 340 described herein can all be performed by the respective VM instances 320, 330, and/or 340, or portions of the functionality can be performed by the respective VM instances 320, 330, and/or 340 and other portions of the functionality can be performed by one or more separate VM instances and/or computing devices.

Figure 3B:
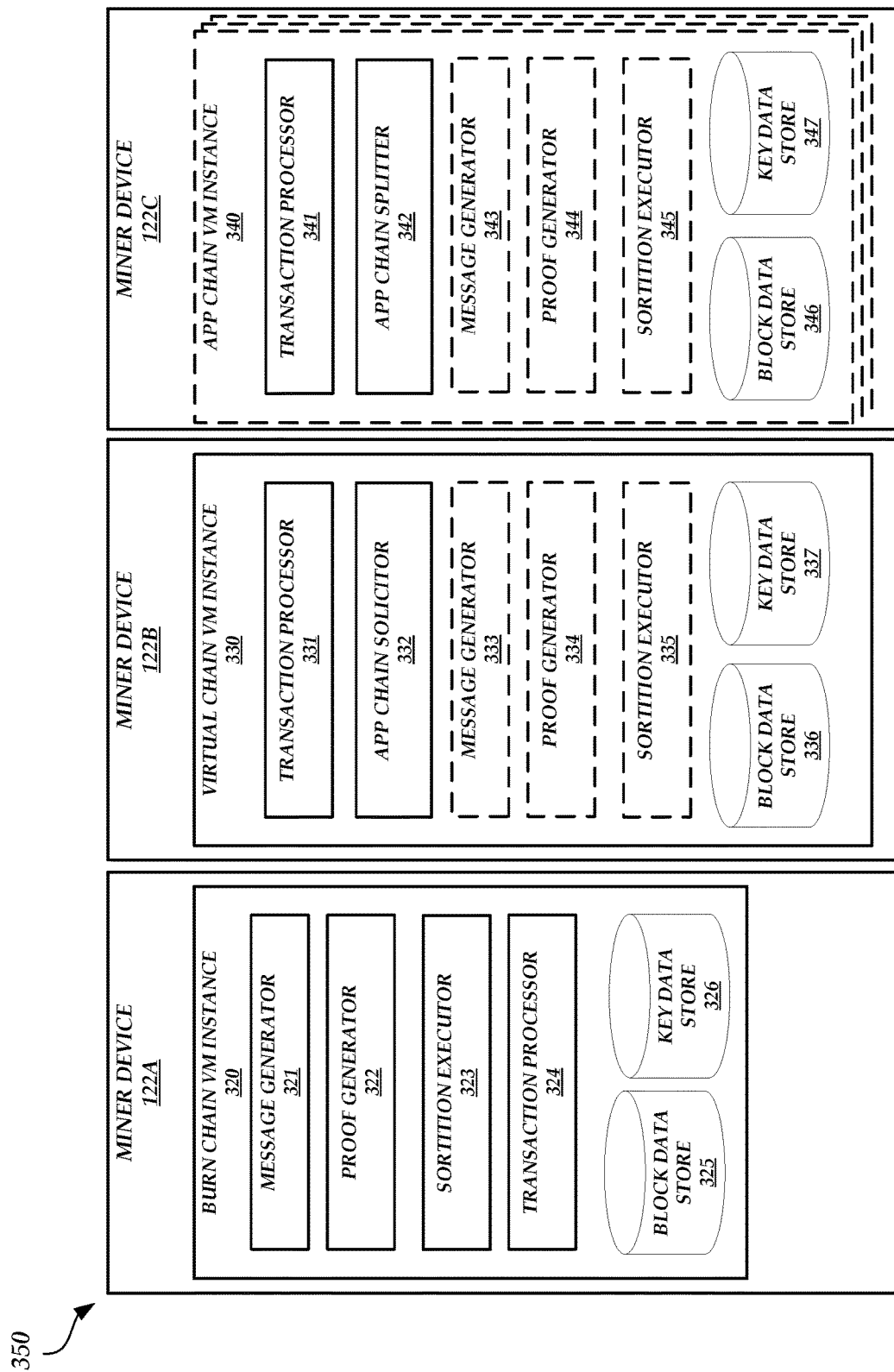
FIG. 3B is another block diagram of an illustrative operating environment in which an improved blockchain is implemented via one or more VM instances.

FIG. 3B is another block diagram of an illustrative operating environment 350 in which an improved blockchain is implemented via one or more VM instances 320, 330, and/or 340. The operating environment 350 is similar to the operating environment 300, except that each VM instance 320, 330, and 340 is initialized by a different miner device 122A-122C. While the VM instances 320, 330, and 340 may be running in different miner devices 122A-122C, the VM instances 320, 330, and/or 340 may nonetheless be configured to communicate with one another.

Example Chain Mitosis Operations

Figure 4:
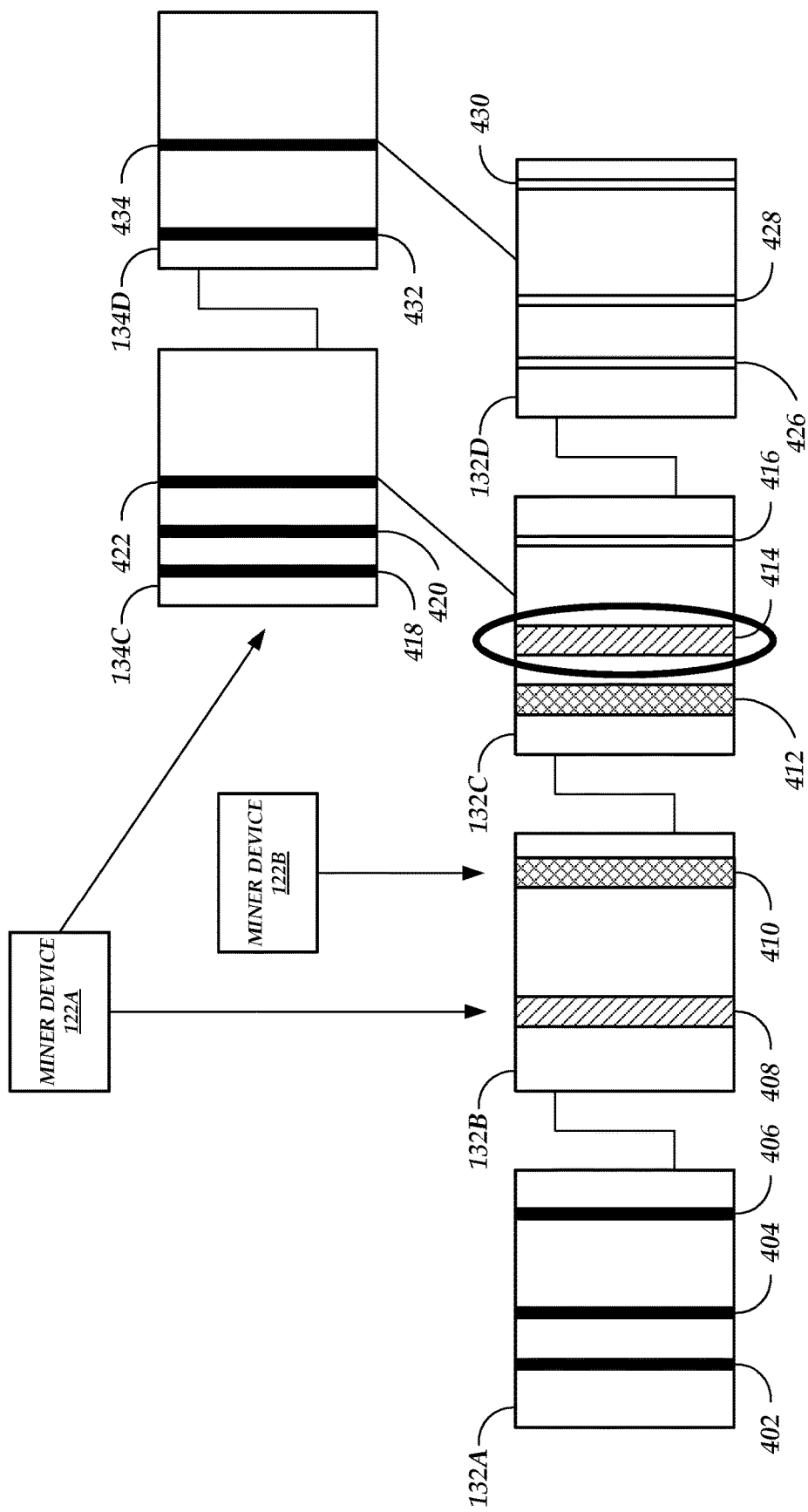
FIG. 4 is a block diagram depicting a process by which chain mitosis with respect to the virtual chain can occur.

FIG. 4 is a block diagram depicting a process by which chain mitosis with respect to the virtual chain can occur. As illustrated in FIG. 4, various transactions 402, 404, and 406 corresponding to the same, first application are stored in virtual chain block 132A. A virtual chain VM instance 230 or 330 may determine that a percentage of virtual and/or physical computing resources allocated to processing the transactions 402, 404, and 406 exceeds a threshold and that this threshold has been exceeded for zero or more virtual chain blocks 132 that preceded the virtual chain block 132.

As a result of this determination, the virtual chain VM instance 230 or 330 enters a pre-fork stage, soliciting initial peers and/or miners. Here, miner device 122A responded to the solicitation with an IP address registration transaction 408 and the miner device 122B responded to the solicitation with an IP address registration transaction 410, which are both stored in virtual chain block 132B (which is a child of virtual chain block 132A). The virtual chain block 132B may further store transactions for the first application and/or for other applications, not shown.

The smart contract code for the first application may define that formation of the app chain should occur 1 block after initial peers and/or miners are solicited. Thus, a virtual chain VM instance 230 or 330 (or the virtual chain node 120 or the miner device 122) may disable the smart contract code for the first application and enable the proof of burn code for the first application for virtual chain block 132C (which is a child of virtual chain block 132B).

A block commit transaction 412 submitted by the miner device 122B and a block commit transaction 414 submitted by the miner device 122A may be stored in the virtual chain block 132C. The virtual chain VM instance 230 or 330 may perform a sortition and select the miner device 122A as the miner to form the first app chain block 134C. As a result, the miner device 122A may form the first app chain block 134C, which stores transactions 418, 420, and 422 that each correspond to the first application (e.g., each provide updates to the data of the first application). No transactions from other applications may be stored in the app chain block 134C. Rather, transactions for other applications may continue to be stored in the virtual chain. For example, transaction 416, which corresponds to a second application, is stored in the virtual chain block 132C. In addition, the next app chain block 134D also stores transactions 432 and 434 corresponding to the first application, whereas the next virtual chain block 132D stores transactions 426, 428, 430 for any other application other than the first application.

After the fork occurs, additional miners can participate in sortitions to become leaders of app chain blocks 134. To participate, a miner device 122 can submit a public key registration transaction and/or a block commit transaction in a manner as described herein. The block commit transaction may include the IP address of the miner device 122 and/or a time that the IP address is valid and/or the miner device 122 may separately provide the IP address in an IP address registration transaction.

Chain Mitosis Control Plane Diagrams

Figure 5:
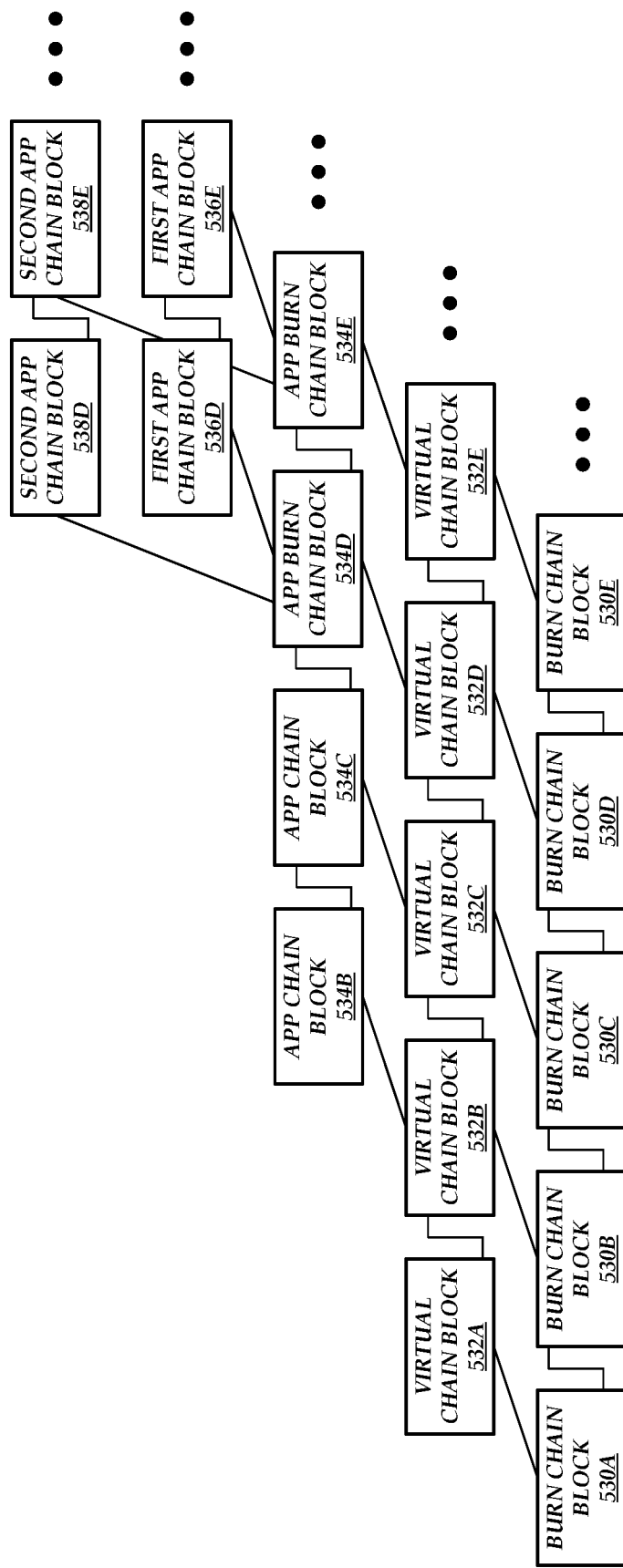
FIG. 5 is a block diagram depicting a control plane in which chain mitosis has occurred with respect to an initial app chain.

FIG. 5 is a block diagram depicting a control plane in which chain mitosis has occurred with respect to an initial app chain. As illustrated in FIG. 5, burn chain blocks 530A-530E and virtual chain blocks 532A-532E are present. A virtual chain VM instance 230 or 330 determines that chain mitosis with respect to the virtual chain should occur at virtual chain block 532B. Thus, a new app chain is formed starting at app chain block 534B.

An app chain VM instance 240 or 340 tasked with monitoring the app chain then determines that chain mitosis with respect to the app chain should occur after app chain block 534C. Thus, the app chain VM instance 240 or 340 converts the original app chain into a proof of burn chain—starting with app burn chain block 534D—and allows for the formation of a first split app chain—starting with first app chain block 536D—and of a second split app chain—starting with second app chain block 538D. Both split app chains may be anchored to the app burn chain, and thus leaders for each split app chain may be chosen using block commit transactions submitted to app burn chain blocks 534D, 534E, etc.

While FIG. 5 illustrates the app chain as being split into two split app chains, this is not meant to be limiting. The app chain can be split into any number of split app chains. Generally, each split app chain may be assigned a specific type of specific types of application transactions for the application associated with the app chain (now app burn chain).

Figure 6:
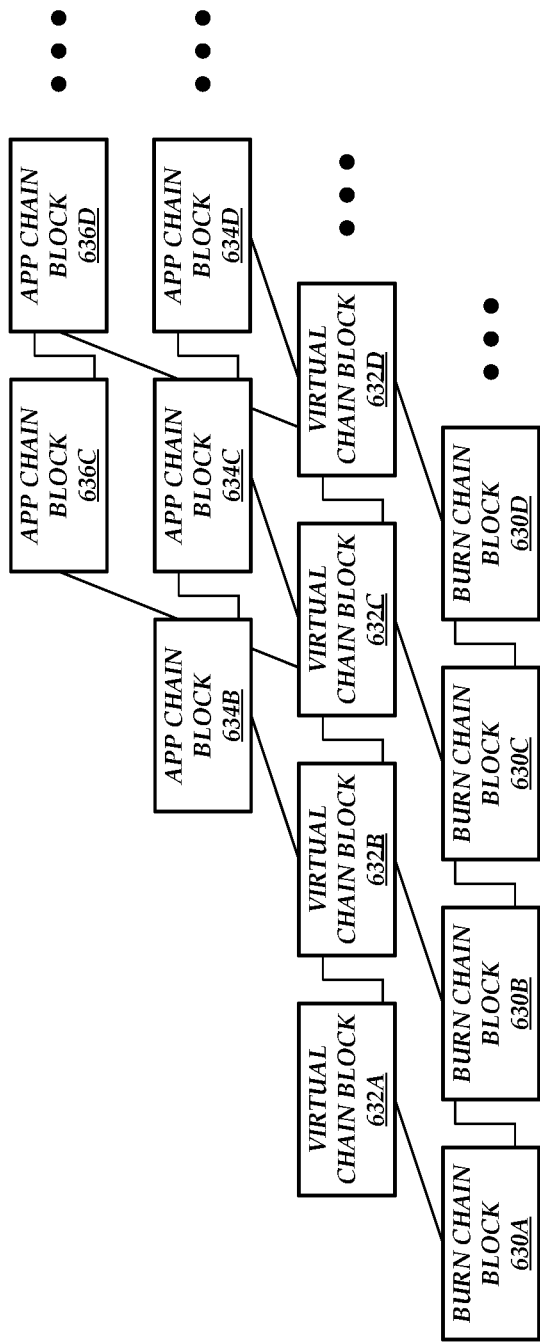
FIG. 6 is a block diagram depicting a control plane in which chain mitosis has occurred twice with respect to a virtual chain.

FIG. 6 is a block diagram depicting a control plane in which chain mitosis has occurred twice with respect to a virtual chain. As illustrated in FIG. 6, burn chain blocks 630A-630D and virtual chain blocks 632A-632D are present. A virtual chain VM instance 230 or 330 determines that chain mitosis with respect to the virtual chain should occur at virtual chain block 632B. Thus, a new app chain is formed starting at app chain block 634B, with the new app chain being associated with a first application such that the app chain blocks 634B-634D store transactions only for the first application.

A virtual chain VM instance 230 or 330 may later determine that chain mitosis with respect to the virtual chain should occur again at virtual chain block 632C. Thus, a second new app chain is formed starting at app chain block 636C, with the second new app chain being associated with a second application such that the app chain blocks 636C-636D store transactions only for the second application.

While FIG. 6 illustrates the virtual chain as being split two, this is not meant to be limiting. The virtual chain can be split any number of times into any number of app chains.

Example Chain Mitosis Flow Diagrams

Figure 7:
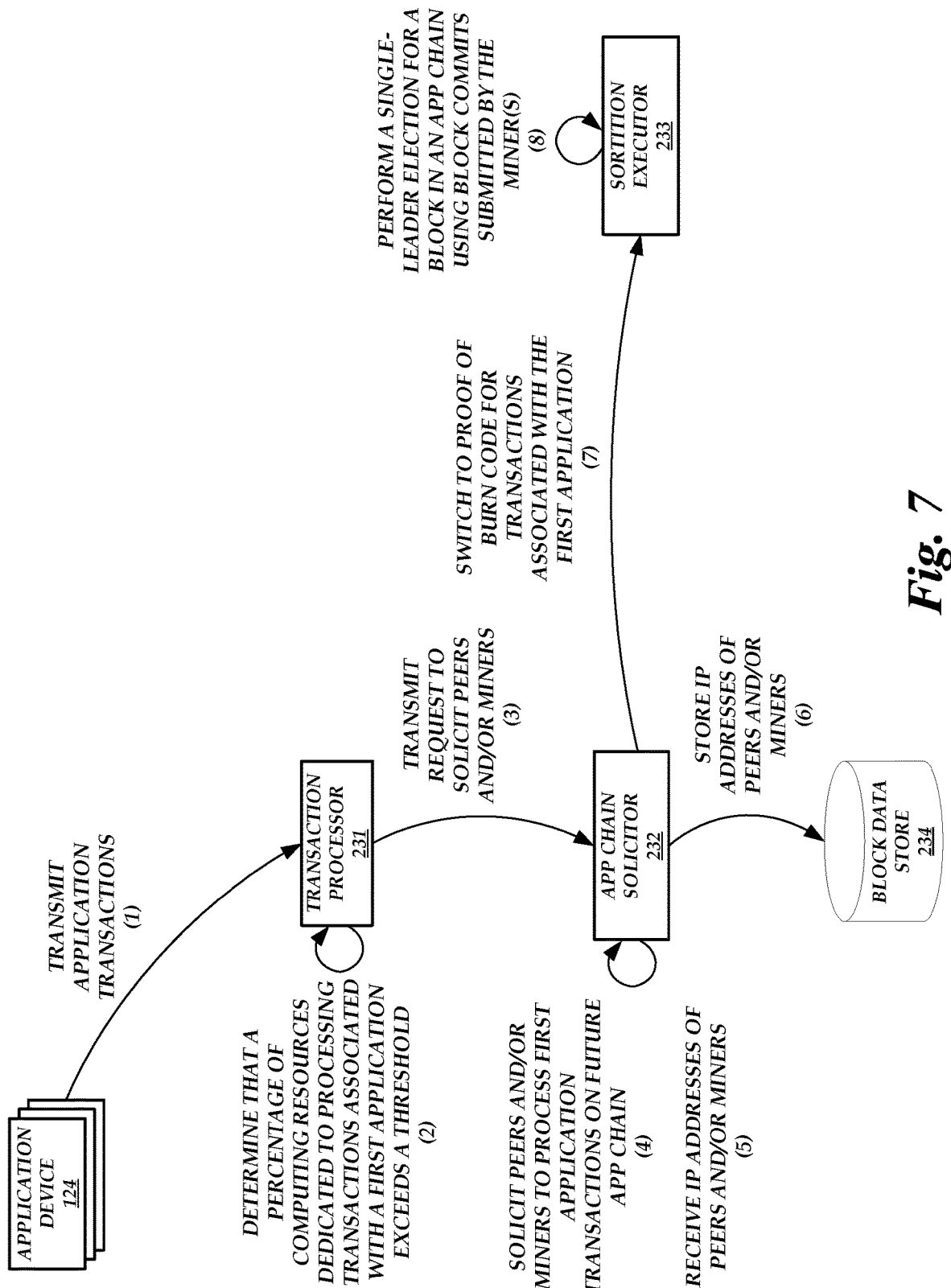
FIG. 7 is a flow diagram illustrating the operations performed by the components of the operating environment of FIGS. 2A-2B to split a virtual chain into the virtual chain and an app chain.

FIG. 7 is a flow diagram illustrating the operations performed by the components of the operating environment 200, 250 of FIGS. 2A-2B to split a virtual chain into the virtual chain and an app chain. As illustrated in FIG. 7, one or more application devices 124 transmit application transactions to virtual chain nodes 120 and/or miner devices 122 in the decentralized network at (1). The application transactions may be for one or more different transactions and may be stored in one or more virtual chain blocks 132.

The transaction processor 231 of a virtual chain VM instance 230 can determine that a percentage of computing resources dedicated to processing transactions associated with a first application exceeds a threshold at (2). The transaction processor 231 may further determine that the percentage has exceeded the threshold for one or more consecutive or non-consecutive virtual chain blocks 132. As a result, the transaction processor 231 transmits a request to the app chain solicitor 232 to solicit peers and/or miners at (3).

The app chain solicitor 232 can solicit peers and/or miners to process or otherwise track first application transactions stored on blocks in a future app chain at (4). In response, peers and/or miners may submit IP address registration transactions, and the app chain solicitor 232 may therefore receive IP addresses of peers and/or miners at (5). The app chain solicitor 232 can store the IP addresses of the peers and/or miners in a table in the block data store 234 at (6).

The app chain solicitor 232 can also cause the virtual chain VM instance 230 to switch from the smart contract code to the proof of burn code for transactions associated with the first application at (7). Alternatively, the virtual chain node 120 or another component of the virtual chain node 120 can disable the smart contract code and enable the proof of burn code. In response to the proof of burn code being enabled, miners can submit block commits to become the leader of an app chain block 134. The sortition executor 233 can perform a single-leader election for a block in an app chain using these block commits submitted by the miner(s) at (8).

While FIG. 7 depicts a numbered set of operations, the numbering does not necessarily mean that such operations must be performed in the numeric order. For example, the operations depicted in FIG. 7 can be performed in an order that does not follow the numeric order.

Figure 8:
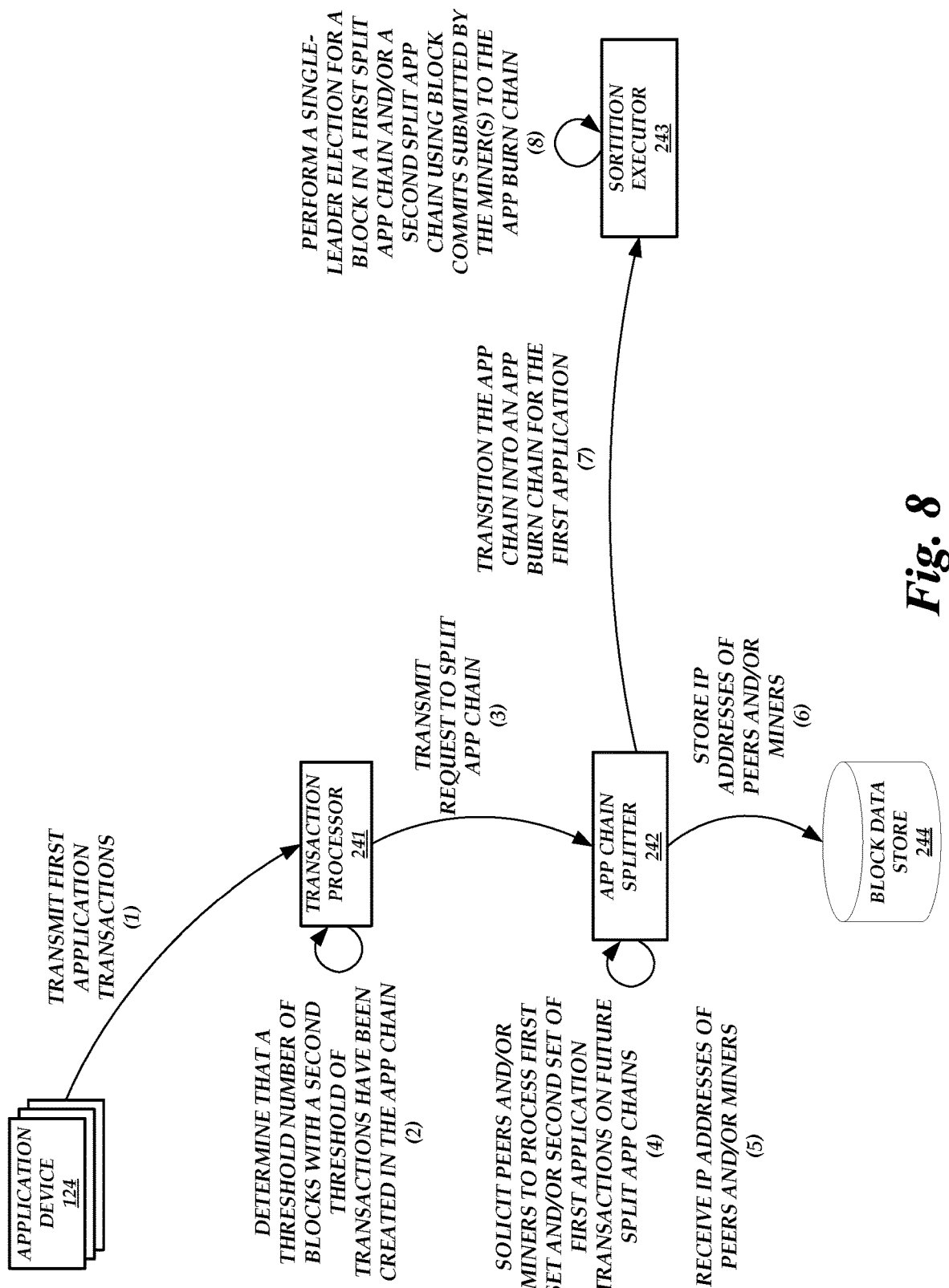
FIG. 8 is a flow diagram illustrating the operations performed by the components of the operating environment of FIGS. 2A-2B to split an app chain into an app burn chain and one or more split app chains.

FIG. 8 is a flow diagram illustrating the operations performed by the components of the operating environment 200, 250 of FIGS. 2A-2B to split an app chain into an app burn chain and one or more split app chains. As illustrated in FIG. 8, one or more application devices 124 transmit application transactions to virtual chain nodes 120 and/or miner devices 122 in the decentralized network at (1). The application transactions may be for a first application and may be stored in one or more app chain blocks 134.

The transaction processor 241 of an app chain VM instance 240 can determine that a threshold number of blocks created in the app chain have a second threshold number of transactions at (2). As a result, the transaction processor 241 transmits a request to the app chain splitter 242 to split the app chain at (3).

The app chain splitter 242 can solicit peers and/or miners to process or otherwise track a first set of first application transactions and/or a second set of first application transactions to be stored on blocks in future split app chains at (4). In response, peers and/or miners may submit IP address registration transactions, and the app chain splitter 242 may therefore receive IP addresses of peers and/or miners at (5). The app chain splitter 242 can store the IP addresses of the peers and/or miners in a table in the block data store 244 at (6).

The app chain splitter 242 can also cause the app chain VM instance 240 to switch from the smart contract code to the proof of burn code, and therefore cause the app chain to transition into an app burn chain for the first application at (7). Alternatively, the virtual chain node 120 or another component of the virtual chain node 120 can disable the smart contract code and enable the proof of burn code. In response to the proof of burn code being enabled, miners can submit block commits to become the leader of a first and/or second split app chain block. The sortition executor 243 can perform a single-leader election for a block in a first split app chain and/or a second split app chain using these block commits submitted by the miner(s) at (8).

While FIG. 8 depicts a numbered set of operations, the numbering does not necessarily mean that such operations must be performed in the numeric order. For example, the operations depicted in FIG. 8 can be performed in an order that does not follow the numeric order.

Figure 9:
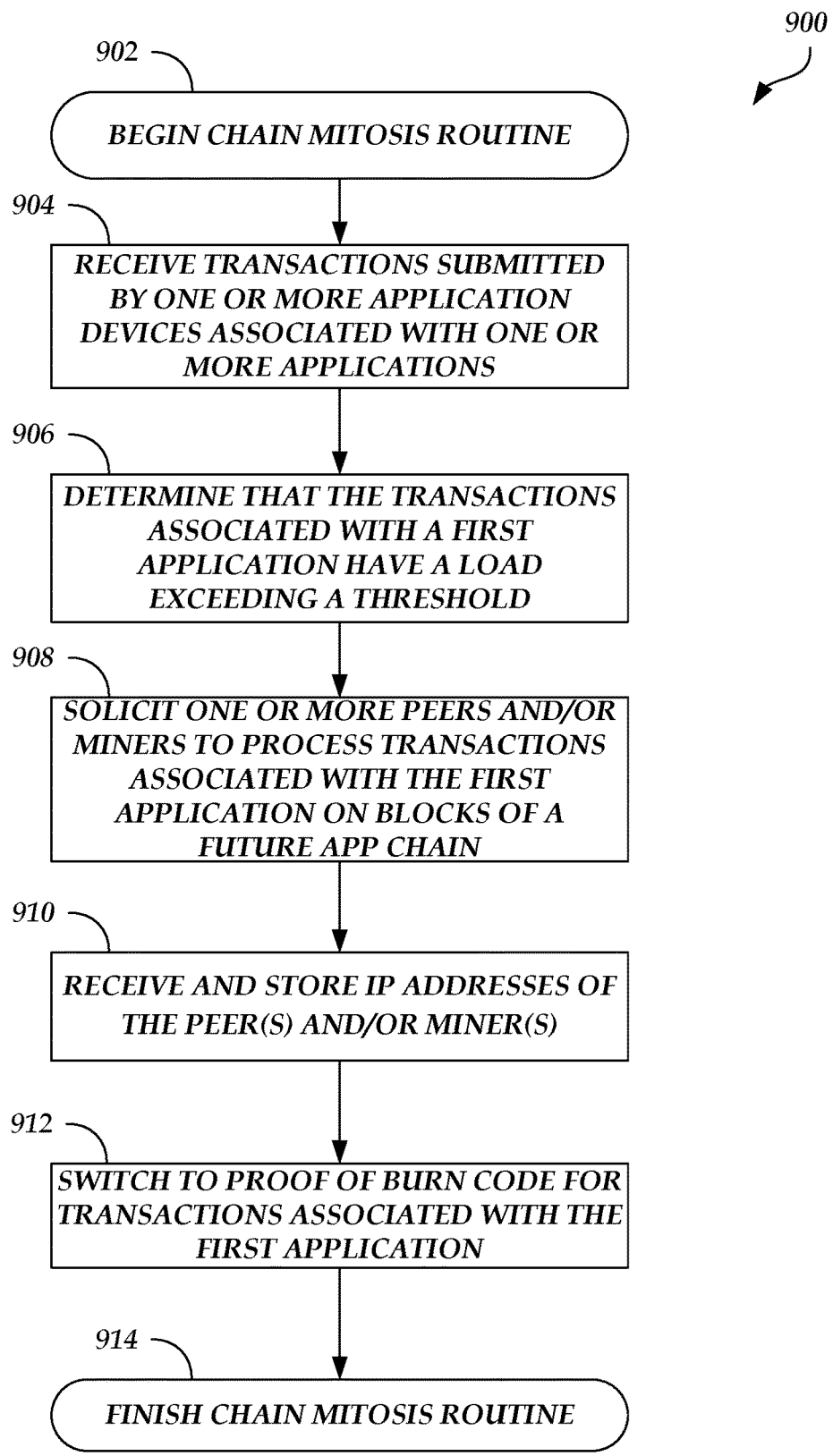
FIG. 9 is a flow diagram depicting a chain mitosis routine illustratively implemented by a virtual chain node or a miner device, according to one embodiment.

FIG. 9 is a flow diagram depicting a chain mitosis routine 900 illustratively implemented by a virtual chain node or a miner device, according to one embodiment. As an example, the virtual chain node 120 of FIG. 1, the miner device 122, or a virtual chain VM instance 230 or 330 running on a virtual chain node 120 or a miner device 122, can be configured to execute the chain mitosis routine 900. The chain mitosis routine 900 begins at block 902.

At block 904, transactions submitted by one or more application devices associated with one or more applications are received. The transactions may be received for storage in one or more virtual chain blocks 132.

At block 906, a determination is made that the transactions associated with a first application have a load exceeding a threshold. For example, the transactions may have a load exceeding the threshold because the percentage of computing resources allocated to processing the transactions exceeds a threshold.

At block 908, one or more peers and/or miners is solicited to process transactions associated with the first application on blocks of a future app chain. For example, the peers and/or miners can be solicited to track and maintain a copy of the future app chain.

At block 910, IP addresses of the peer(s) and/or miner(s) is received and stored. For example, the IP addresses may be received via IP address registration transactions.

At block 912, a switch is made to proof of burn code for transactions associated with the first application. In addition, smart contract code for transactions associated with the first application may be disabled. After the switch is made, the chain mitosis routine 900 finishes, as shown at block 914.

Figure 10:
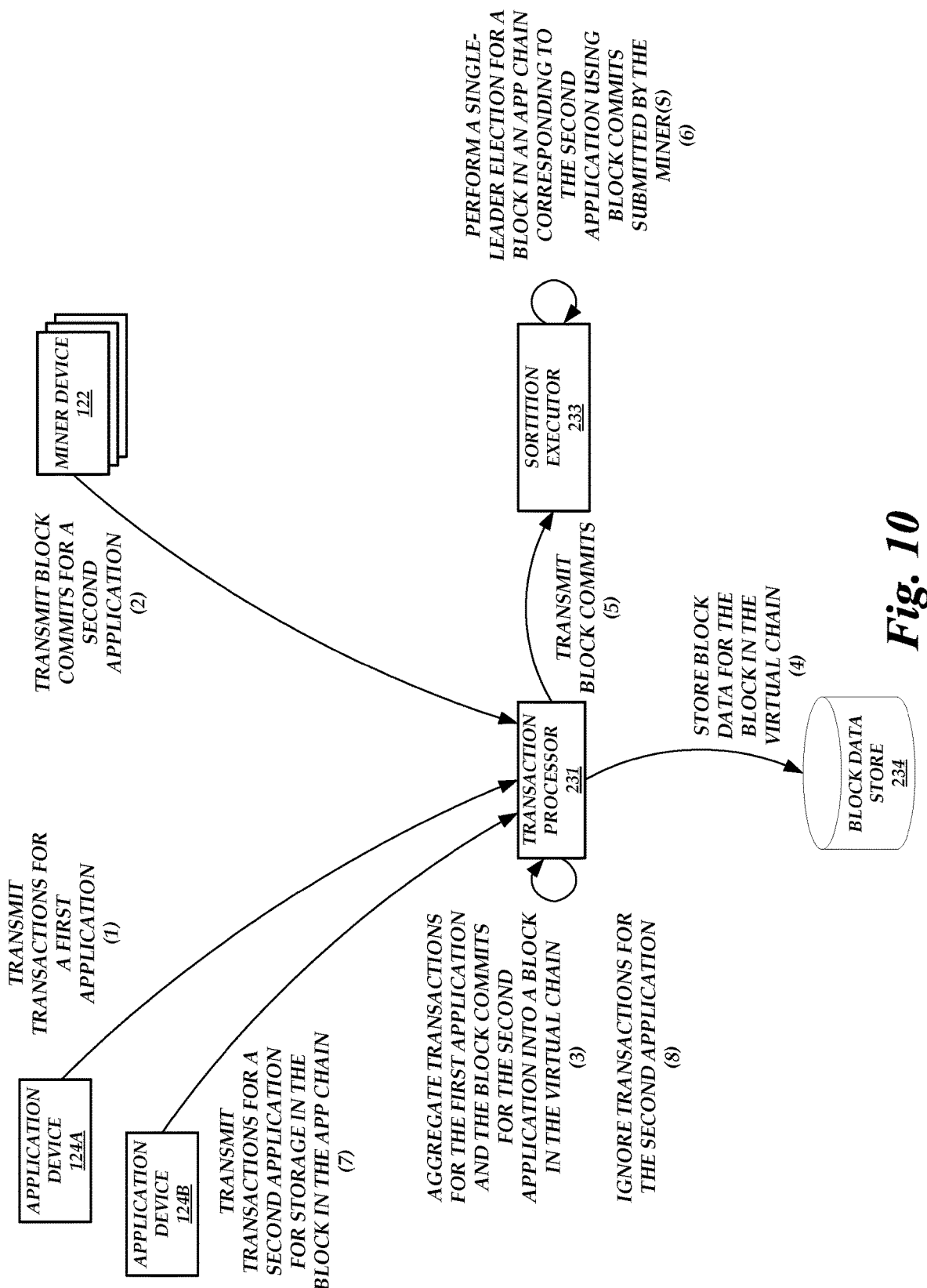
FIG. 10 is a flow diagram illustrating the operations performed by the components of the operating environment of FIGS. 2A-2B to reduce a processing load of a virtual chain node 120 once an app chain is formed.

Fewer, more, or different blocks can be used as part of the routine 900. In some cases, one or more blocks can be omitted. Furthermore, it will be understood that the various blocks described herein with reference to FIG. 9 can be implemented in a variety of orders, or can be performed concurrently.

Selective Transaction Processing Flow Diagrams FIG. 10 is a flow diagram illustrating the operations performed by the components of the operating environment 200, 250 of FIGS. 2A-2B to reduce a processing load of a virtual chain node 120 once an app chain is formed. As illustrated in FIG. 10, an application device 124A transmits transactions for a first application to virtual chain nodes 120 and/or miner devices 122 in the decentralized network at (1). The transactions may be transmitted after an app chain corresponding to a second application has already been formed. The transactions may be for one or more different types of transactions and may be stored in one or more virtual chain blocks 132.

Before, during, and/or after the application device 124A transmits the transactions for the first application, one or more miner devices 122 can transmit block commits for a second application at (2). The miner device(s) 122 can transmit block commits for the second application because an app chain for the second application has already been formed, and the miner device(s) 122 may be attempting to participate in a sortition to be selected as a leader of the next block in the app chain. The block commits may be stored in one or more virtual chain blocks 132.

The transaction processor 231 of a virtual chain VM instance 230 can aggregate transactions for the first application and the block commits for the second application into a block in the virtual chain at (3). For example, the transactions that form the virtual chain block 132 can include both the transactions for the first application and the block commits for the second application. The virtual chain block 132 may be formed by a miner selected as a leader of the virtual chain block 132, and the transaction processor 231 can store a copy of this virtual chain block 132. In particular, the transaction processor 231 can store block data for the block in the virtual chain in the block data store 234 at (4).

Because the app chain is already formed, the sortition executor 233 can use the block commits to perform a sortition. For example, the transaction processor 231 can transmit the block commits to the sortition executor 233 at (5), and the sortition executor 233 can perform a single-leader election for a block in an app chain corresponding to the second application using the block commits submitted by the miner(s) (e.g., the miner device(s) 122) at (6).

Before, during, and/or after the sortition is performed, an application device 124B may transmit transactions for the second application for storage in a block in the app chain at (7). The transactions may be transmitted to various virtual chain nodes 120 and/or miner devices 122 in the decentralized network using a gossip protocol. However, some virtual chain nodes 120 and/or miner devices 122 may not be interested in tracking the app chain (e.g., where a virtual chain node 120 and/or miner device 122 can track an app chain by storing block data for some or all of the blocks in the app chain). For example, some virtual chain nodes 120 and/or miner devices 122 may only be interested in transactions of certain applications or specific types of transactions, and the app chain may only store transactions for an application that the virtual chain node(s) 120 and/or miner device(s) 122 are not interested in. Thus, the virtual chain node(s) 120 and/or miner device(s) 122 may not even include VM instances to track the app chain, split app chain, etc. corresponding to the application or type of transactions that the virtual chain node(s) 120 and/or miner device(s) 122 is not interested in. Instead of processing transactions for applications in which a virtual chain node 120 or miner device 122 is not interested, the virtual chain node 120 or miner device 122 can simply ignore such transactions, reducing the amount of computing resources allocated to tracking the blockchain and allowing additional computing resources to be allocated to other tasks. In particular, the virtual chain node 120 or miner device 122 can decline to store any block data for blocks in the app chain that store such transactions. Accordingly, if the virtual chain node 120 that includes the transaction processor 231 is not interested in transactions of the second application, the transaction processor 231 can simply ignore the transactions for the second application at (8) even if such transactions are received by the virtual chain node 120.

Accordingly, the virtual chain node 120 can selectively process transactions submitted to the blockchain. For example, the virtual chain node 120 can process transactions for inclusion in a virtual chain block 132, but can ignore transactions (and therefore not process transactions or store corresponding block data) for inclusion in another chain, such as an app chain block 134. The virtual chain node 120 may still process block commit transactions that are used to select the leader of the next block in an app chain, but the block commit transactions may be simply be processed to validate that a sortition was performed properly and that a sufficient amount of cryptocurrency was burned by the miners attempting to be leaders of blocks in the app chain.

Virtual chain node(s) 120 and/or miner device(s) 122 can further ignore transactions corresponding to other chains, such as split app chains, split proof of burn chains, etc., in the same manner. For example, a virtual chain node 120 or miner device 122 may track an app chain. However, the virtual chain node 120 or miner device 122 may only be interested in certain types of transactions for the application associated with the app chain (e.g., transactions originating from a particular geographic region, transactions directed to user profile data, transactions directed to leaderboard data, transactions directed to user progression data, etc.). If the app chain is then split into an app burn chain and three split app chains, the virtual chain node 120 or miner device 122 may track the app burn chain and one of the split app chains (e.g., because this split app chain is associated with the type(s) of transactions that the virtual chain node 120 or miner device 122 is interested in), but not the other two split app chains.

While FIG. 10 depicts a numbered set of operations, the numbering does not necessarily mean that such operations must be performed in the numeric order. For example, the operations depicted in FIG. 10 can be performed in an order that does not follow the numeric order.

Figure 11:
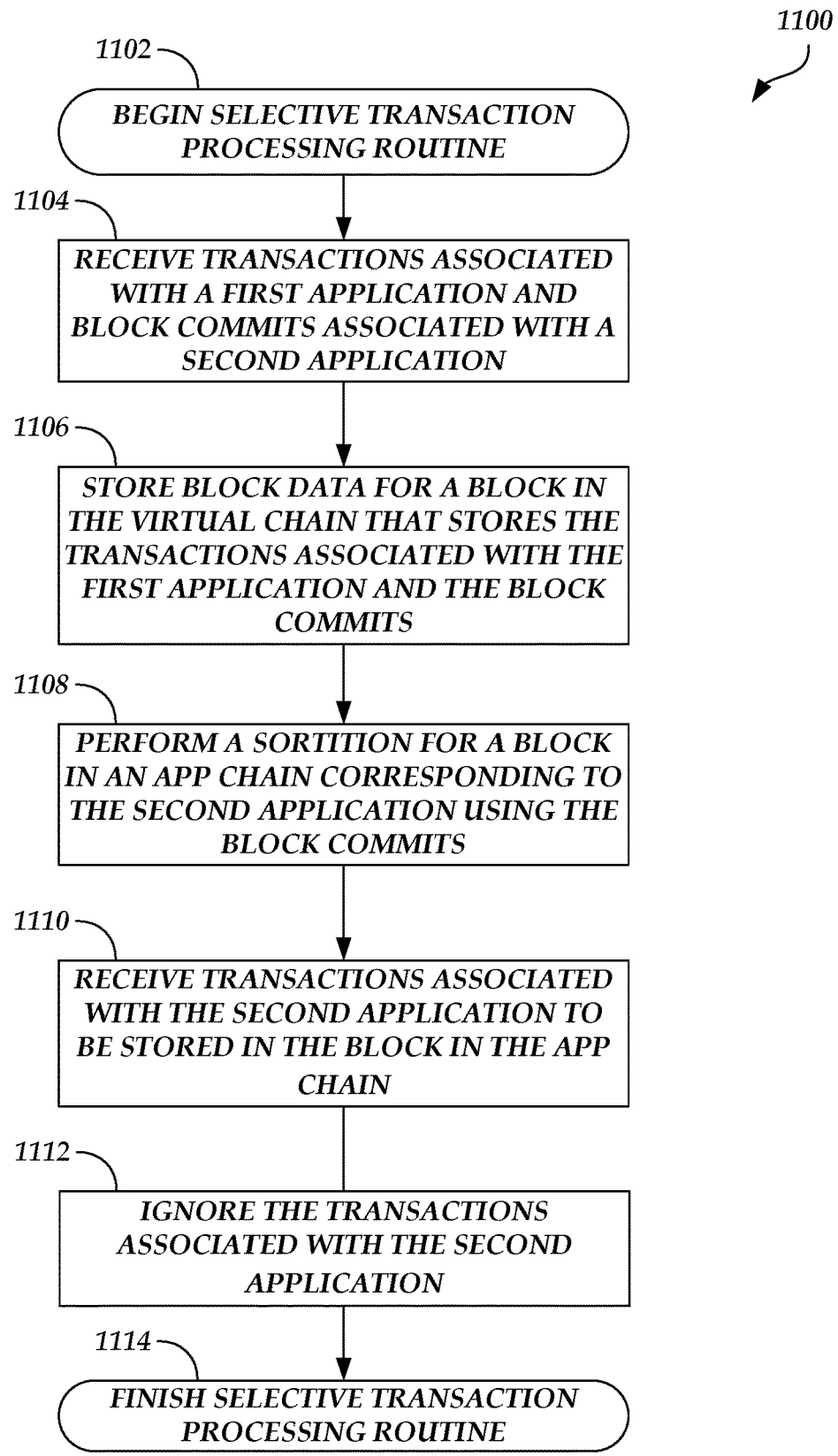
FIG. 11 is a flow diagram depicting a selective transaction processing routine illustratively implemented by a virtual chain node or a miner device, according to one embodiment.

FIG. 11 is a flow diagram depicting a selective transaction processing routine 1100 illustratively implemented by a virtual chain node or a miner device, according to one embodiment. As an example, the virtual chain node 120 of FIG. 1, the miner device 122, or a virtual chain VM instance 230 or 330 running on a virtual chain node 120 or a miner device 122, can be configured to execute the selective transaction processing routine 1100. The selective transaction processing routine 1100 begins at block 1102.

At block 1104, transactions associated with a first application and block commit transactions associated with a second application are received. For example, the transactions associated with the first application can be received via a decentralized network from one or more application devices 124 and/or user's wallets. The transactions can be received after the virtual chain has been split at least once to form an app chain. For example, the virtual chain may have been split 1, 2, 3, etc. times to form one or more app chains. One of the formed app chain(s) may correspond with the second application (e.g., blocks in this app chain may store transactions for the second application only).

At block 1106, block data for a block in the virtual chain that stores the transactions associated with the first application and the block commits is stored. For example, the block can store the transactions associated with the first application and the block commit transactions. The block can further store transactions for other applications other than the second application. The block in the virtual chain may not store transactions for the second application because the smart contract code for the second application may be disabled (e.g., by a virtual chain node 120 or miner device 122), thereby preventing functions used to store second application transactions from being invoked with respect to the virtual chain. The block in the virtual chain can store block commit transactions for the second application, however, because the proof of burn code for the second application may be enabled (e.g., by a virtual chain node 120 or miner device 122).

At block 1108, a sortition is performed for a block in the app chain corresponding to the second application using the block commit transactions. For example, the sortition may be a single-leader election.

At block 1110, transactions associated with the second application are received. The transactions may be received for eventual storage in a block in the app chain. However, the virtual chain node 120 or miner device 122 that receives the transactions may not be interested in transactions of the second application. Rather, the virtual chain node 120 or miner device 122 may be interested in transactions of a first application, a third application, and/or the like.

Thus, at block 1112, the transactions associated with the second application can be ignored. For example, the virtual chain node 120 or miner device 122 can decline to store block data for a block in the app chain that stores the transactions associated with the second application. The virtual chain node 120 or miner device 122 may optionally broadcast to other peers messages that indicate the submission of transactions associated with the second application when such messages are received via the decentralized network, but the virtual chain node 120 or miner device 122 may not have to process the transactions associated with the second application, track the app chain itself, or otherwise validate that the app chain block 134 in which the transactions associated with the second application are stored is a well-formed block (e.g., a block formed according to the rules of the blockchain). After the transactions associated with the second application are ignored, the selective transaction processing routine 1100 finishes, as shown at block 1114.

Fewer, more, or different blocks can be used as part of the routine 1100. In some cases, one or more blocks can be omitted. Furthermore, it will be understood that the various blocks described herein with reference to FIG. 11 can be implemented in a variety of orders, or can be performed concurrently.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or logic circuitry that implements a state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computing device of a decentralized network comprising:
   a network interface configured to couple the computing device to the decentralized network;
   a hardware processor; and
   a non-transitory computer readable storage medium storing program instructions for execution by the hardware processor in order to cause the computing device to:
      process a plurality of transactions received from one or more application devices via the decentralized network, wherein the plurality of transaction are each associated with a first application and are received for storage in a block of a virtual chain;
      determine that the plurality of transactions associated with the first application have a load exceeding a threshold;
      in response to the determination that the load exceeds the threshold, solicit, via the decentralized network, a peer device to process a future plurality of transactions associated with the first application for storage in a first block of an app chain to be formed and that will be anchored to the virtual chain; and
      enable a proof of burn code corresponding to the first application to allow one or more miner devices to participate in a single-leader election for selecting a miner device in the one or more miner devices to mine the first block in the app chain.

2. The computing device of claim 1, wherein the program instructions, when executed, further cause the computing device to determine that a percentage of computing resources of the computing device allocated to processing the plurality of transactions exceeds the threshold.

3. The computing device of claim 2, wherein the program instructions, when executed, further cause the computing device to determine that the percentage of computing resources of the computing device allocated to processing the plurality of transactions exceeds the threshold for a second threshold number of blocks in the virtual chain.

4. The computing device of claim 3, wherein the percentage of computing resources of the computing device allocated to processing the plurality of transactions exceeds the threshold for the second threshold number of consecutive blocks in the virtual chain.

5. The computing device of claim 1, wherein the program instructions, when executed, further cause the computing device to enable the proof of burn code at a block in the virtual chain at which the first block in the app chain is anchored.

6. The computing device of claim 1, wherein the program instructions, when executed, further cause the computing device to process a block commit transaction received via the decentralized network from a second miner device in the one or more miner devices after the proof of burn code is enabled.

7. The computing device of claim 6, wherein the program instructions, when executed, further cause the computing device to perform a sortition using the block commit transaction to select a leader of a second block in the app chain.

8. The computing device of claim 1, wherein the program instructions, when executed, further cause the computing device to disable smart contract code corresponding to the first application at a block in the virtual chain at which the first block in the app chain is anchored.

9. The computing device of claim 1, wherein the virtual chain logically resides above a burn chain that corresponds to a first cryptocurrency, and wherein a second miner device in the one or more miner devices is configured to submit a block commit transaction in the burn chain to burn a first amount of the first cryptocurrency to participate in a sortition to be selected to mine one or more blocks in the virtual chain.

10. The computing device of claim 1, wherein blocks in the app chain store transactions corresponding to the first application only.

11. The computing device of claim 1, wherein a block in the virtual chain that precedes a block in the virtual chain at which the first block in the app chain is anchored stores a first transaction corresponding to the first application, and wherein a block in the virtual chain that follows the block in the virtual chain at which the first block in the app chain is anchored does not store any transaction corresponding to the first application.

12. The computing device of claim 1, wherein the program instructions, when executed, further cause the computing device to perform a chain mitosis in which the app chain is split into an app burn chain, a first split app chain, and a second split app chain in response to a determination that a number of transactions corresponding to the first application that are stored in the app chain exceed a threshold.

13. The computing device of claim 12, wherein a block in the app burn chain stores at least one of one or more first block commit transactions used to select a second miner device in the one or more miner devices to mine a block in the first split app chain or one or more second block commit transactions used to select a third miner device in the one or more miner devices to mine a block in the second split app chain.

14. The computing device of claim 12, wherein a block in the first split app chain stores one or more transactions of a first type only, and wherein a block in the second split app chain stores one or more transactions of a second type only.

15. The computing device of claim 14, wherein the one or more transactions of the first type correspond to one or more transactions of the first application that originate from a first geographic region, and wherein the one or more transactions of the second type correspond to one or more transactions of the first application that originate from a second geographic region that is different than the first geographic region.

16. A computer-implemented method comprising:
under control of a computing device in a decentralized network,
receiving a plurality of transactions from one or more application devices via the decentralized network, wherein the plurality of transaction are each associated with a first application and are received for storage in a block of a virtual chain;
determining that the plurality of transactions associated with the first application have a load exceeding a threshold;
in response to the determination that the load exceeds the threshold, soliciting, via the decentralized network, a peer device to process a future plurality of transactions associated with the first application for storage in a first block of an app chain to be formed and that will be anchored to the virtual chain; and
enabling a proof of burn code corresponding to the first application to allow one or more miner devices to participate in a single-leader election for selecting a miner device in the one or more miner devices to mine the first block in the app chain.

17. The computer-implemented method of claim 16, wherein determining that the plurality of transactions associated with the first application have a load exceeding a threshold further comprises determining that a percentage of computing resources of the computing device allocated to processing the plurality of transactions exceeds the threshold.

18. The computer-implemented method of claim 17, wherein determining that a percentage of computing resources of the computing device allocated to processing the plurality of transactions exceeds the threshold further comprises determining that the percentage of computing resources of the computing device allocated to processing the plurality of transactions exceeds the threshold for a second threshold number of blocks in the virtual chain.

19. Non-transitory, computer-readable storage media comprising computer-executable instructions for performing chain mitosis in a blockchain, wherein the computer-executable instructions, when executed by a computer system, cause the computer system to:
process a plurality of transactions received from one or more application devices via a decentralized network to which the computer system communicates, wherein the plurality of transaction are each associated with a first application and are received for storage in a block of a virtual chain;
determine that an app chain should fork off the virtual chain in response to processing the plurality of transactions associated with the first application;
in response to the determination that the app chain should fork off the virtual chain, solicit, via the decentralized network, a peer device to process a future plurality of transactions associated with the first application for storage in a first block of an app chain to be formed and that will be anchored to the virtual chain; and
enable a proof of burn code corresponding to the first application to allow one or more miner devices to participate in a single-leader election for selecting a miner device in the one or more miner devices to mine the first block in the app chain.

20. The non-transitory, computer-readable storage media of claim 19, wherein the computer-executable instructions further cause the computer system to:
determine that a percentage of computing resources of the computing device allocated to processing the plurality of transactions exceeds a threshold; and
determine that the app chain should fork off the virtual chain in response to the determination that the percentage exceeds the threshold.

* * * * *